(12) United States Patent
Zhang et al.

(10) Patent No.: US 11,082,708 B2
(45) Date of Patent: Aug. 3, 2021

(54) MULTIPLE-MODEL LOCAL ILLUMINATION COMPENSATION

(71) Applicant: QUALCOMM Incorporated, San Diego, CA (US)

(72) Inventors: Li Zhang, San Diego, CA (US); Wei-Jung Chien, San Diego, CA (US); Kai Zhang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 24 days.

(21) Appl. No.: 16/238,815

(22) Filed: Jan. 3, 2019

(65) Prior Publication Data

US 2019/0215522 A1    Jul. 11, 2019

Related U.S. Application Data

(60) Provisional application No. 62/614,799, filed on Jan. 8, 2018.

(51) Int. Cl.
*H04N 19/186* (2014.01)
*H04N 19/117* (2014.01)
(Continued)

(52) U.S. Cl.
CPC ......... *H04N 19/186* (2014.11); *H04N 19/105* (2014.11); *H04N 19/117* (2014.11);
(Continued)

(58) Field of Classification Search
CPC .. H04N 19/186; H04N 19/105; H04N 19/159; H04N 19/176; H04N 19/196; H04N 19/139
See application file for complete search history.

(56) References Cited

U.S. PATENT DOCUMENTS

2011/0286678 A1* 11/2011 Shimizu ................ H04N 19/80
                                                        382/233
2013/0188690 A1*  7/2013 Kim ..................... H04N 19/157
                                                       375/240.03
(Continued)

FOREIGN PATENT DOCUMENTS

EP       2398241 A1    12/2011
WO    2014007551 A1     1/2014

OTHER PUBLICATIONS

Jianle Chen; Algorithm Description of Joint Exploration Test Model 7 (JEM 7); Jul. 2017 (Year: 2017).*

(Continued)

*Primary Examiner* — Jamie J Atala
*Assistant Examiner* — Hesham K Abouzahra
(74) *Attorney, Agent, or Firm* — Shumaker & Sieffert, P.A.

(57) ABSTRACT

A method of processing video data includes classifying, by processing circuitry, luma samples of a neighboring luma block of a reference block and luma samples of a neighboring luma block of a current block into a plurality of groups and deriving, by the processing circuitry, one or more local illumination compensation parameters for each group of the plurality of groups to generate a plurality of local illumination compensation parameters for the current block. The method further includes deriving, by the processing circuitry, a plurality of linear models between the neighboring luma block of the reference block and the neighboring luma block of the current block using the plurality of local illumination compensation parameters for the current block and generating, by the processing circuitry, a prediction block using the plurality of linear models.

26 Claims, 14 Drawing Sheets

(51) Int. Cl.
| | |
|---|---|
| H04N 19/136 | (2014.01) |
| H04N 19/82 | (2014.01) |
| H04N 19/182 | (2014.01) |
| H04N 19/105 | (2014.01) |
| H04N 19/159 | (2014.01) |
| H04N 19/176 | (2014.01) |
| H04N 19/196 | (2014.01) |
| H04N 19/597 | (2014.01) |
| H04N 19/577 | (2014.01) |
| H04N 19/139 | (2014.01) |

(52) U.S. Cl.
CPC ......... *H04N 19/136* (2014.11); *H04N 19/159* (2014.11); *H04N 19/176* (2014.11); *H04N 19/182* (2014.11); *H04N 19/196* (2014.11); *H04N 19/82* (2014.11); *H04N 19/139* (2014.11); *H04N 19/577* (2014.11); *H04N 19/597* (2014.11)

(56) References Cited

U.S. PATENT DOCUMENTS

| | | | | |
|---|---|---|---|---|
| 2014/0010305 | A1* | 1/2014 | Mironovich | H04N 19/597 375/240.16 |
| 2016/0366415 | A1* | 12/2016 | Liu | H04N 19/119 |
| 2019/0387254 | A1* | 12/2019 | An | H04N 19/82 |
| 2020/0021822 | A1* | 1/2020 | An | H04N 19/117 |
| 2020/0366900 | A1* | 11/2020 | Jun | H04N 19/11 |

OTHER PUBLICATIONS

Algorithm Description of Joint Exploration Test Model 7 (JEM7), 119. MPEG Meeting; Jul. 17, 2017-Jul. 21, 2017; Torino; (Motion Picture Expert Group or ISO/IEC JTC1/SC29/WG11), No. N17055, Oct. 6, 2017, XP030023716, 48 Pages.

Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v1, 40 pages.

Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v1, 7 pages.

Fujibayashi A., et al., "TE12: Performance of Partition Based Illumination Compensation (PBIC)", 3rd JCT-VC Meeting, 94th MPEG Meeting, Jul. 10, 2010-Oct. 15, 2010, Guangzhou, (Joint Collaborative Team on Video Coding of ISO/IEC JTC1/SC29/WG11 and ITU-T SG.16), URL: http://WFTP3.ITU.INT/AV-ARCH/JCTVC-SITE/, No. JCTVC-C041, Oct. 1, 2010 (Oct. 1, 2010), XP030007748 (12 pp).

Hu N., et al., "Unification of Parameter Derivation for CCLM and LIC," JVET-D0122_v2, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.

International Search Report and Written Opinion—PCT/US2019/012306—ISA/EPO—dated Mar. 25, 2019.

ITU-T H.261, Line Transmission of Non-Telephone Signals, Video Codec for Audiovisual Services at px64 kbits, The International Telecommunication Union, Mar. 1993, 29 pp.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.

ITU-T H.263, Series H: Audiovisual and Multimedia Systems, Infrastructure of audiovisual services—Coding of moving video, Video coding for low bit rate communication, The International Telecommunication Union. Jan. 2005, 226 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H265, Series H: Audiovisual and Multimedia Systems, Infrastructure of Audiovisual Services—Coding of Moving Video, High Efficiency Video Coding, The International Telecommunication Union, Apr. 2013, 317 Pages.

Tech G., et al., "3D-HEVC Draft Text 7," Joint Collaborative Team on 3D Video Coding Extensions of ITU-T SG 16 WP 3 and ISO/IEC JTC 1/SC 29/WG 11, Feb. 12-18, 2015, Document: JCT3V-K1001-v7, 113 pp.

Kamp et al., "Decoder-side motion vector derivation for block-based video coding," IEEE Transactions on Circuits and Systems for Video Technology, vol. 22, No. 12; pp. 1732-1745, Dec. 2012.

Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.

Kim et al., "New Frame Rate Up-Conversion Algorithms with Low Computational Complexity," IEEE Transactions on Circuits and Systems for Video Technology, vol. 24, No. 3; pp. 384-393, Mar. 2014.

Lee et al., "Frame Rate Up Conversion Based on Variational Image Fusion," IEEE Transactions on Image Processing, vol. 23, No. 1, Jan. 2014, pp. 399-412.

Liu et al., "Multiple Hypotheses Bayesian Frame Rate Up-Conversion by Adaptive Fusion of Motion-Compensated Interpolations," IEEE Transactions on Circuits and Systems for Video Technology, vol. 22, No. 8, Aug. 2012, pp. 1188-1198.

Chiu et al., "Decoder-Side Motion Estimation and Wiener Filter for HEVC," 2013 Visual Communications and Image Processing (VCIP), IEEE, Nov. 17, 2013; XP032543658, DOI: 10.1109/VCIP.2013.6706446 [retrieved on Jan. 8, 2014], 6 pp.

* cited by examiner

REFERENCE BLOCK

CURRENT CU

MULTIPLE-MODEL LOCAL ILLUMINATION COMPENSATION

This application claims the benefit of U.S. Provisional Patent Application 62/614,799, filed on Jan. 8, 2018, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to an improvement on the local illumination compensation in block-based video coding. For example, a video coder (e.g., video encoder or video decoder) may derive multiple linear models for deriving a prediction block. In this way, the video coder may generate a prediction block using the multiple linear models to help to minimize an amount of residual data signaled. One or more techniques described herein for local illumination compensation, may be applied to any of the existing video codecs, such as HEVC (High Efficiency Video Coding) or H.266/Versatile Video Coding (VVC) standard, or be may be used in any future video coding standards.

In one example, a method of processing video data includes: classifying, by processing circuitry, luma samples of a neighboring luma block of a reference block and luma samples of a neighboring luma block of a current block into a plurality of groups; deriving, by the processing circuitry, one or more local illumination compensation parameters for each group of the plurality of groups to generate a plurality of local illumination compensation parameters for the current block; deriving, by the processing circuitry, a plurality of linear models between the neighboring luma block of the reference block and the neighboring luma block of the current block using the plurality of local illumination compensation parameters for the current block; and generating, by the processing circuitry, a prediction block using the plurality of linear models.

In another example, an apparatus for processing video data includes one or more storage media; and one or more processors configured to: classify luma samples of a neighboring luma block of a reference block and luma samples of a neighboring luma block of a current block into a plurality of groups; derive one or more local illumination compensation parameters for each group of the plurality of groups to generate a plurality of local illumination compensation parameters for the current block; derive a plurality of linear models between the neighboring luma block of the reference block and the neighboring luma block of the current block using the plurality of local illumination compensation parameters for the current block; and generate a prediction block using the plurality of linear models.

In another example, a device for processing video data includes means for classifying luma samples of a neighboring luma block of a reference block and luma samples of a neighboring luma block of a current block into a plurality of groups; means for deriving one or more local illumination compensation parameters for each group of the plurality of groups to generate a plurality of local illumination compensation parameters for the current block; means for deriving a plurality of linear models between the neighboring luma block of the reference block and the neighboring luma block of the current block using the plurality of local illumination compensation parameters for the current block; and means for generating a prediction block using the plurality of linear models.

In another example, a computer-readable storage medium is encoded with instructions that, when executed, cause a programmable processor to: classify luma samples of a neighboring luma block of a reference block and luma samples of a neighboring luma block of a current block into a plurality of groups; derive one or more local illumination compensation parameters for each group of the plurality of groups to generate a plurality of local illumination compensation parameters for the current block; derive a plurality of linear models between the neighboring luma block of the reference block and the neighboring luma block of the current block using the plurality of local illumination compensation parameters for the current block; and generate a prediction block using the plurality of linear models.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

This disclosure describes techniques related to local illumination compensation (LIC). The techniques may be used in the context of advanced video codecs, such as the next generation of video coding standards, including but not limited to the H.266 (also called versatile video coding (VVC)) standard presently under development. According to some LIC algorithms, for each prediction direction, one linear model is used to derive a prediction block for a current block. However, existing LIC algorithms may introduce error in the prediction block when the illumination changes are different from sample to sample within the current block, thereby increasing an amount of residual data signaled to transmit video data (e.g., the prediction block becomes a poorer predictor of the block being encoded or decoded). The techniques of this disclosure enable video coding devices to derive and apply multiple linear models to derive a prediction block for a current block. As such, the techniques of this disclosure mitigate error introduced by illumination changes between samples of a single block.

As used herein, the term "video coder" refers generically to both video encoders and video decoders. Similarly, in this disclosure, the terms "video coding" or "coding" may refer generically to video encoding or video decoding. Thus, unless stated otherwise, it should be assumed that techniques described with reference to coding may be performed by either a video encoder or a video decoder. In some portions of this application, certain techniques may be described with reference to video decoding or to a video decoder. It should not be assumed, however, that such techniques are not applicable to video encoding or may be not be performed by a video encoder. Such techniques may, for example, be performed as part of determining how to encode video data or may be performed as part of a video decoding loop in a video encoder.

As used in this disclosure, the term current block refers to a block currently being coded, as opposed to a block that is already coded or yet to be coded. Similarly, a current coding unit (CU), prediction unit (PU), or transform unit (TU), refers to a coding unit, prediction unit, or transform unit that is currently being coded.

Figure 1:
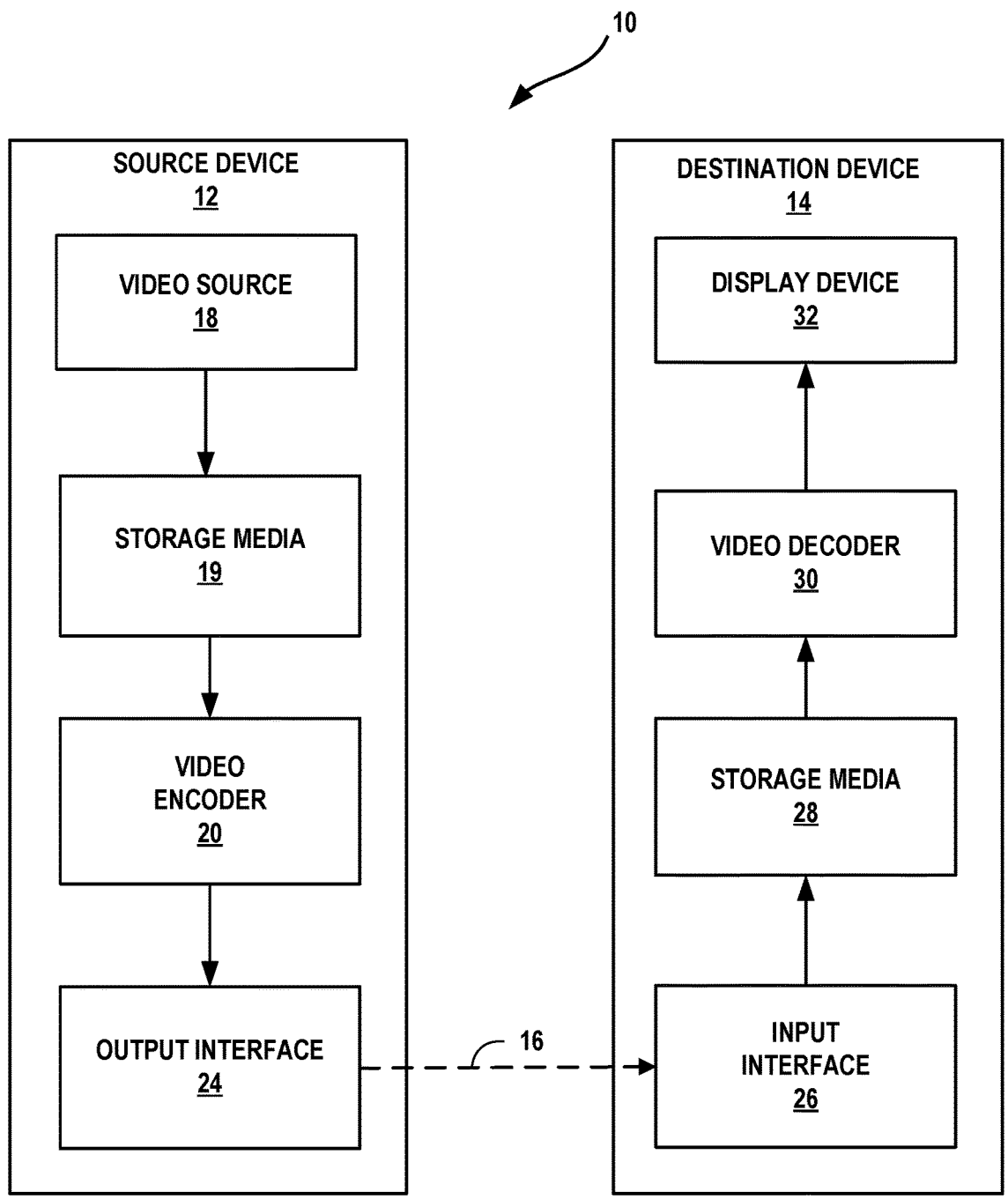
FIG. 1 is a block diagram illustrating an example video encoding and decoding system that may utilize one or more techniques described in this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In accordance with this disclosure, video encoder 20 of source device 12 and video decoder 30 of destination device 14 may be configured to apply the techniques for classifying, by processing circuitry, luma samples of a neighboring luma block of a reference block and luma samples of a neighboring luma block of a current block into a plurality of groups, deriving, by the processing circuitry, one or more local illumination compensation parameters for each group of the plurality of groups to generate a plurality of local illumination compensation parameters for the current block, deriving, by the processing circuitry, a plurality of linear models between the neighboring luma block of the reference block and the neighboring luma block of the current block using the plurality of local illumination compensation parameters for the current block, and generating, by the processing circuitry, a prediction block using the plurality of linear models. Thus, source device 12 represents an example of a video encoding device, while destination device 14 represents an example of a video decoding device.

In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. Similarly, input interface 26 (e.g., a receiver) may be configured to demodulate, according to a wireless communication standard, a signal comprising the encoded video data. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 (also referred to herein as a "receiver") of destination device 14 receives information from computer-readable medium 16. Input interface 26 may be configured to receive encoded video data. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a video coding standard, High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

In 2016, MPEG and ITU-T VCEG formed a joint exploration video team (JVET) to explore new coding tools for the next generation of video coding standard. The reference software is called JEM (joint exploration model).

An early draft for new video coding standard, referred to as the H.266/Versatile Video Coding (VVC) standard, is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina. The techniques of this disclosure, however, are not limited to any particular coding standard. Video encoder 20 and video decoder 30 may operate according to any video coding standard, such as HEVC, VVC, proprietary or other industry standards, such as the Joint Exploration Test Model (JEM), etc. The techniques of this disclosure, however, are not limited to any particular coding standard.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may encode blocks of a picture of the video data. Video encoder 20 may include, in a bitstream, an encoded representation of the video block. For example, in HEVC, to generate an encoded representation of a picture, video encoder 20 may generate a set of coding tree units (CTUs). Each of the CTUs may comprise one or more coding tree blocks (CTBs) and may comprise syntax structures used to code the samples of the one or more coding tree blocks. For instance, each a CTU may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). A syntax structure may be defined as zero or more syntax elements present together in the bitstream in a specified order. The size of a CTB can range from 16×16 to 64×64 in the HEVC main profile (although technically 8×8 CTB sizes can be supported).

In HEVC, a slice includes an integer number of CTUs ordered consecutively in a raster scan order. Thus, in HEVC, the largest coding unit in a slice is called a coding tree block (CTB).

In HEVC, to generate a coded CTU of a picture, video encoder 20 may recursively perform quad-tree partitioning on the coding tree blocks of a CTU to divide the coding tree blocks into coding blocks, hence the name "coding tree units." A coding block is an N×N block of samples. A coding unit (CU) may comprise one or more coding blocks and syntax structures used to code samples of the one or more coding blocks. For example, a CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. Thus, a CTB may contain a quad-tree, the nodes of which are CUs.

Furthermore, video encoder 20 may encode a CU. For instance, to encode a CU, video encoder 20 may partition a coding block of a CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

In HEVC, each CU is coded with one mode, which could be either intra mode or inter mode. When a CU is inter coded (i.e., inter mode is applied), the CU may be further partitioned into 2 or 4 PUs or become just one PU when further partitioning does not apply. When two PUs are present in one CU, the two PUs can be half size rectangles or two rectangle sizes with ¼ or ¾ size of the CU. There are eight partition modes for a CU coded with inter prediction mode, i.e., PART_2N×2N, PART_2N×N, PART_N×2N, PART_N× N, PART_2N×nU, PART_2N×nD, PART_nL×2N and PART_nR×2N. While an example using HEVC is used, other examples may use other standards, such as, but not limited to, the VVC standard.

When the CU is inter coded, one set of motion information is present for each PU. In addition, each PU is coded with a unique inter-prediction mode to derive the set of motion information. If video encoder 20 uses intra prediction to generate the predictive blocks of a PU, video encoder 20 may generate the predictive blocks of the PU based on decoded samples of the picture that includes the PU. When a CU is intra coded, 2N×2N and N×N are the only permissible PU shapes, and within each PU a single intra prediction mode is coded (while chroma prediction mode is signalled at CU level). The N×N intra PU shapes are only allowed when the current CU size is equal to the smallest CU size defined in a sequence parameter set (SPS).

JEM/VVC also provides an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

To perform intra-prediction, video encoder 20 may select an intra-prediction mode to generate the prediction block. Examples of JEM/VVC provides sixty-seven intra-prediction modes, including various directional modes, as well as planar mode and DC mode. In general, video encoder 20 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 20 codes CTUs and CUs in raster scan order (left to right, top to bottom).

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

Figure 4A:
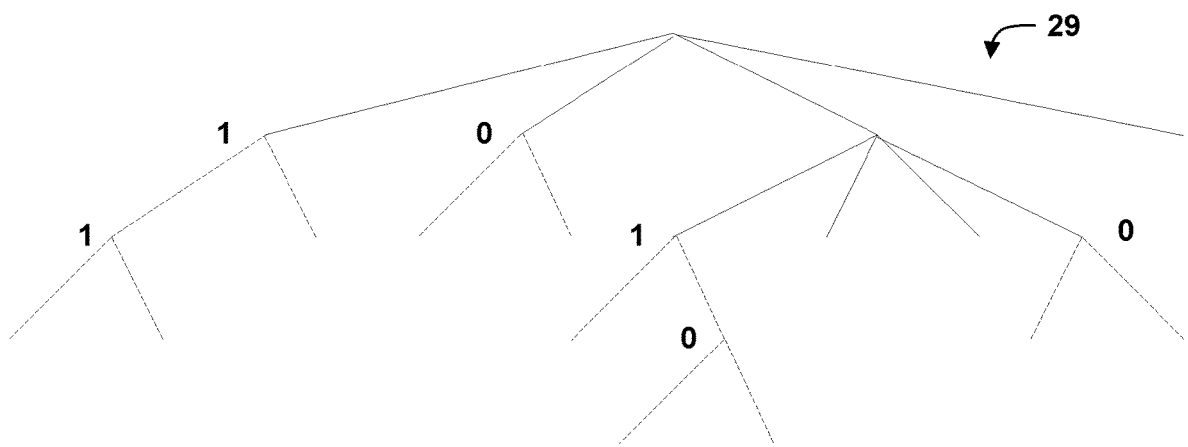
FIGS. 4A and 4B are conceptual diagrams illustrating an example quadtree binary tree (QTBT) structure, and a corresponding coding tree unit (CTU).
Figure 4B:
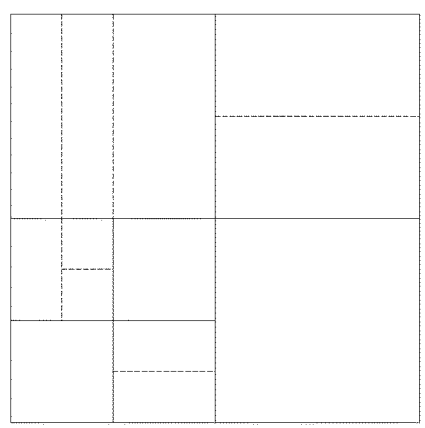

FIGS. 4A and 4B are conceptual diagrams illustrating an example quadtree binary tree (QTBT) structure 29, and a corresponding coding tree unit (CTU) 31. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 29 (i.e., the solid lines) and syntax elements (such as splitting information) for a prediction tree level of QTBT structure 29 (i.e., the dashed lines). Video encoder 20 may encode, and video decoder 30 may decode, video data, such as prediction and transform data, for CUs represented by terminal leaf nodes of QTBT structure 29.

In general, CTU 31 of FIG. 4B may be associated with parameters defining sizes of blocks corresponding to nodes of QTBT structure 29 at the first and second levels. These parameters may include a CTU size (representing a size of CTU 31 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes encoded video data. For example, the bitstream may comprise a sequence of bits that forms a representation of coded pictures of the video data and associated data. Thus, the bitstream comprises an encoded representation of video data. In some examples, a representation of a coded picture may include encoded representations of blocks. Thus, video encoder 20 may signal, in the bitstream, transform coefficients of a block in an encoded representation of the block. In some instances, video encoder 20 may use one or more syntax elements to signal each transform coefficient of the block.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Motion information is discussed in the following. For each block, a set of motion information may be available. A set of motion information may include motion information for forward and/or backward prediction directions. In this disclosure, forward and backward prediction directions may be two prediction directions of a bi-directional prediction mode and the terms "forward" and "backward" may not have a geometry meaning. Instead the terms "forward" and "backward" may correspond to reference picture list 0 (RefPicList0) and reference picture list 1 (RefPicList1) of a current picture. When only one reference picture list is available for a picture or slice, only RefPicList0 may be available and the motion information of each block of a slice may be always forward.

In some cases, a motion vector together with its reference index is used in decoding processes, such a motion vector with the associated reference index is denoted as a uni-predictive set of motion information.

For each prediction direction, the motion information may include a reference index and a motion vector. In some cases, for simplicity, a motion vector itself may be referred in a way that it is assumed that it has an associated reference index. A reference index may be used to identify a reference picture in the current reference picture list (RefPicList0 or RefPicList1). A motion vector may have a horizontal and a vertical component.

Picture order count (POC) may be used in video coding standards to identify a display order of a picture. Although there are cases when two pictures within one coded video sequence may have the same POC value, such cases typically do not occur within a coded video sequence. When multiple coded video sequences are present in a bitstream, pictures with a same value of POC may be closer to each other in terms of decoding order.

POC values of pictures are typically used for reference picture list construction, derivation of reference picture set as in HEVC and motion vector scaling.

In H.264/AVC, each inter macroblock (MB) may be partitioned into four different ways: One 16×16 MB partition; Two 16×8 MB partitions; Two 8×16 MB partitions; and Four 8×8 MB partitions. Different MB partitions in one MB may have different reference index values for each direction (RefPicList0 or RefPicList1). When an MB is not partitioned into four 8×8 MB partitions, the MB has only one motion vector for each MB partition in each direction.

When an MB is partitioned into four 8×8 MB partitions, a video coder (e.g., video encoder 20 or video decoder 30) may further partition each 8×8 MB into sub-blocks, each of which may have a different motion vector in each direction. There are four different ways to get sub-blocks from an 8×8 MB partition: One 8×8 sub-block; Two 8×4 sub-blocks; Two 4×8 sub-blocks; and Four 4×4 sub-blocks. Each sub-block may have a different motion vector in each direction. Therefore, a motion vector may be present in a level equal to higher than sub-block.

In AVC, temporal direct mode may be enabled in either the MB or the MB partition level for skip or direct mode in B slices. For each MB partition, a video coder may use the motion vectors of the block co-located with the current MB partition in the RefPicList1[0] of the current block to derive the motion vectors. The video coder may scale each motion vector in the co-located block based on POC distances.

In AVC, a video coder may use a direct mode to predict motion information from the spatial neighbors.

To review HEVC, in HEVC, the largest coding unit in a slice is called a coding tree block (CTB). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, the CU may be further partitioned into 2 or 4 prediction units (PUs) or become just one PU when further partition does not apply. When two PUs are present in one CU, the Pus may be half size rectangles or two rectangle size with ¼ or ¾ size of the CU.

When the CU is inter coded, one set of motion information may be present for each PU. In addition, a video coder may code each PU with a unique inter-prediction mode to derive the set of motion information.

In the HEVC standard, there are two inter prediction modes, named merge (skip is considered as a special case of merge) and advanced motion vector prediction (AMVP) modes respectively for a prediction unit (PU).

In either AMVP or merge mode, a video coder may maintain a motion vector (MV) candidate list for multiple motion vector predictors. The video coder may generate the motion vector(s), as well as reference indices in the merge mode, of the current PU by taking one candidate from the MV candidate list. The MV candidate list may contain up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, a video coder may use the reference pictures for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, a video coder may further refine the predicted motion vectors.

As can be seen above, a merge candidate may correspond to a full set of motion information while an AMVP candidate contains just one motion vector for a specific prediction direction and reference index. The candidates for both modes may be derived similarly from the same spatial and temporal neighboring blocks.

Figure 2B:
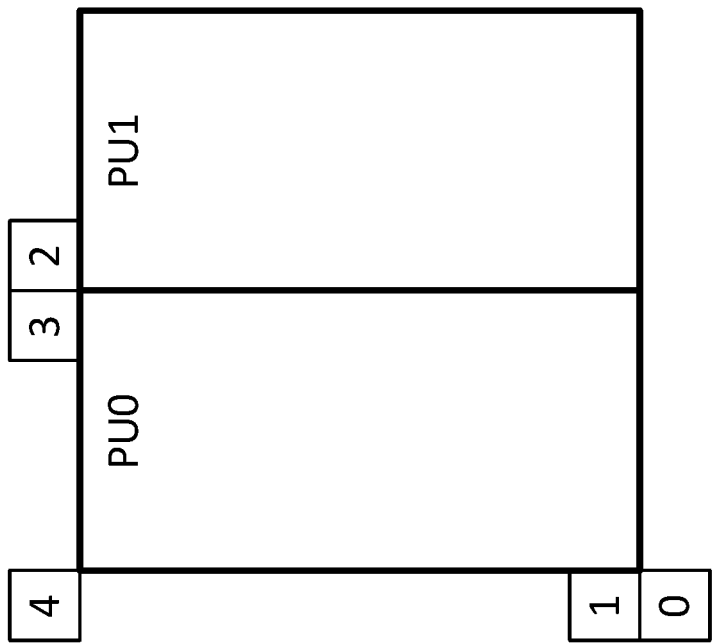
FIGS. 2A and 2B are block diagrams illustrating spatial MV candidate derivation using neighboring blocks, with respect to both merge mode and AMVP mode video coding.
Figure 2A:
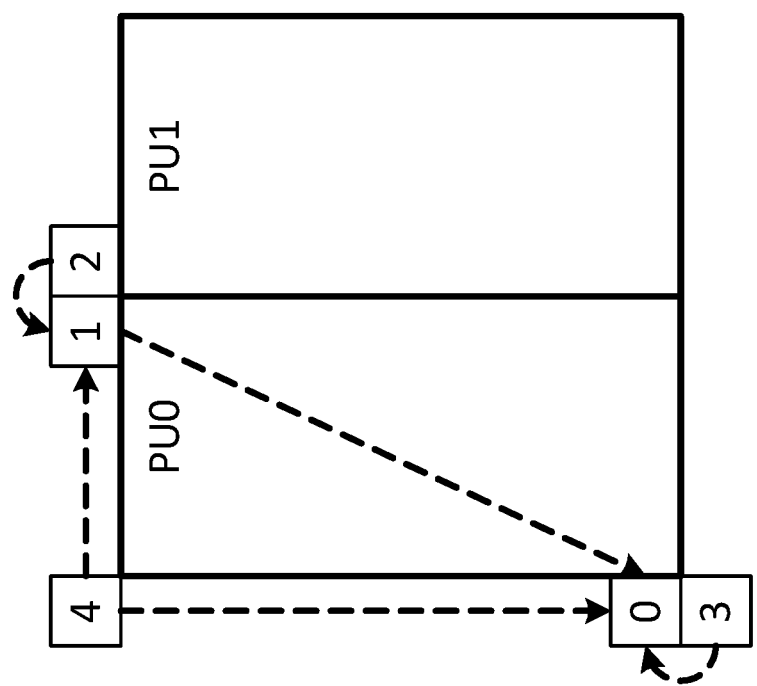

A video coder may derive spatial MV candidates from the neighboring blocks shown on FIGS. 2A and 2B, for a specific PU (PU0), although the techniques for generating the candidates from the blocks may differ for merge and AMVP modes. In merge mode, a video coder may derive up to four spatial MV candidates with the orders showed on FIG. 2A with numbers, and the order is the following: left (0), above (1), above right (3), below left (4), and above left (5), as shown in FIG. 2A.

In AVMP mode, a video coder may divide the neighboring blocks into two groups: left group consisting of the block 0 and 1, and above group consisting of the blocks 2, 3, and 4 as shown on FIG. 2B. For each group, the potential candidate in a neighboring block referring to the same reference picture as that indicated by the signaled reference index may have the highest priority to be chosen to form a final candidate of the group. It is possible that all neighboring blocks do not contain a motion vector pointing to the same reference picture. Therefore, if such a candidate cannot be found, a video coder may scale the first available candidate to form the final candidate, thus the temporal distance differences may be compensated.

A video coder may add a temporal motion vector predictor (TMVP) candidate, if enabled and available, into the MV candidate list after spatial motion vector candidates. The process of motion vector derivation for TMVP candidate may be the same for both merge and AMVP modes, however the target reference index for the TMVP candidate in the merge mode may always be set to 0.

Figure 3B:
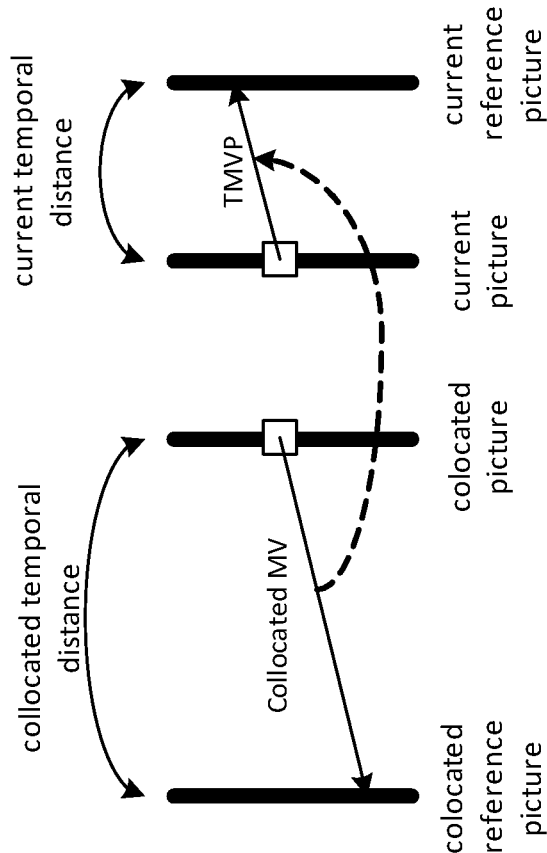
FIGS. 3A and 3B are block diagrams illustrating temporal MV predictor (TMVP) candidate derivation and MV scaling, with respect to both merge mode and AMVP mode video coding.
Figure 3A:
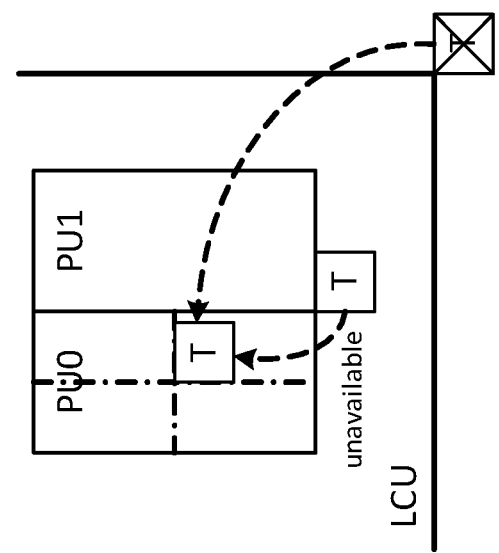

The primary block location for TMVP candidate derivation is the bottom right block outside of the collocated PU as shown in FIG. 3A as a block "T", to compensate the bias to the above and left blocks used to generate spatial neighboring candidates. However, if that block is located outside of the current CTB row or motion information is not available, a video coder may substitute the block with a center block of the PU.

A video coder may derive a motion vector for TMVP candidate from the co-located PU of the co-located picture, indicated in the slice level. Similar to temporal direct mode in AVC, a video coder may scale a motion vector of the TMVP candidate motion vector to compensate the distance differences.

In some examples, the value of motion vectors is proportional to the distance of pictures in the presentation time. A motion vector associates two pictures, the reference picture, and the picture containing the motion vector (namely the containing picture). When a video coder utilizes a motion vector to predict the other motion vector, the distance of the containing picture and the reference picture may be calculated based on the Picture Order Count (POC) values.

For a motion vector to be predicted, both its associated containing picture and reference picture may be different. Therefore, a video coder may calculate a new distance (based on POC). The video coder may scale the motion vector based on these two POC distances. For a spatial neighboring candidate, the containing pictures for the two motion vectors may be the same, while the reference pictures may be different. In HEVC, a video coder may apply motion vector scaling to both TMVP and AMVP for spatial and temporal neighboring candidates.

If a motion vector candidate list is not complete, a video coder may generate and insert artificial motion vector candidates at the end of the list until the motion vector candidate list has all candidates.

In merge mode, there are two types of artificial MV candidates: combined candidate derived only for B-slices and zero candidates used only for AMVP if the first type does not provide enough artificial candidates. For each pair of candidates that are already in the candidate list and have necessary motion information, a video coder may derive bi-directional combined motion vector candidates by a combination of the motion vector of the first candidate referring to a picture in the list 0 and the motion vector of a second candidate referring to a picture in the list 1.

Candidates from different blocks may happen to be the same, which decreases the efficiency of a merge/AMVP candidate list. A video coder may apply a pruning process to solve this problem of candidates from different blocks having the same candidates. A video coder may apply a pruning process which compares one candidate against the others in the current candidate list to avoid inserting identical candidate in certain extent. To reduce the complexity, the video coder may apply only limited numbers of pruning process instead of comparing each potential one with all the other existing ones. While an example using HEVC is used, other examples may use other standards, such as, but not limited to, the VVC standard.

An overview of Illumination compensation proposed for HEVC is discussed in the following. While an example using HEVC is used, other examples may use other standards, such as, but not limited to, the VVC standard. In JCTVC-C041: "TE12: Performance of Partition Based Illumination Compensation (PBIC)" Joint Collaborative Team on Video Coding (JCT-VC) of ITU-T SG 16 WP3 and ISO/IEC JTC1/SC29/WG11 by Fujibayashi et al., Partition Based Illumination Compensation (PBIC) was proposed. Different from weighted prediction which enables/disables weighted prediction (WP) and signals WP parameters at slice level, PBIC enables/disables illumination compensation (IC) and signals IC parameters at PU level to handle the local illumination variation.

Similar with WP, a video coder may use a scaling factor (also denoted by a) and an offset (also denoted by b) in IC, and the shift number is fixed to be 6. A video encoder may encode an IC flag for each PU to indicate whether IC applies for current PU or not. If IC applies for the PU, a video encoder may signal a set of IC parameters (i.e., a and b) to video decoder 30 and is used for motion compensation. In bi-prediction case, video encoder 20 may signal two scaling factors (one for each prediction direction) and one offset.

To save bits spent on IC parameters, a chroma component may share the scaling factors with luma component and a video coder may use a fixed offset 128.

An overview of illumination compensation in 3D-HEVC is discussed in the following. While an example using HEVC is used, other examples may use other standards, such as, but not limited to, the VVC standard.

Examples of 3D-HEVC may be found in G. Tech, K. Wegner, Y. Chen and S. Yea, "3D-HEVC Draft Text 7", Joint Collaborative Team on 3D Video Coding Extensions (JCT-3V) Doc., JCT3V-K1001, 11th Meeting: Geneva, Switzerland, 12-18 Feb. 2015.). In 3D-HEVC, IC is enabled for inter-view prediction. Different from WP and PBIC which signals IC parameters explicitly, 3D-HEVC derives IC parameters based on neighboring samples of current CU and neighboring samples of reference block.

In IC, a video coder may apply to 2N×2N partition mode only. For AMVP mode, a video encoder may signal one IC flag for each CU that is predicted from inter-view reference picture. For merge mode, to save bits, a video encoder may signal an IC flag only when merge index of the PU is not equal to 0.

IC may not apply to a CU that is only predicted from temporal reference pictures.

A video coder may use a linear IC model in inter-view prediction is shown in Eq. (1):

$$p(i,j)=a*r(i+dv_x, j+dv_y)+b, \text{ where}(i,j) \in PU_c \quad (1)$$

Here, $PU_c$ is the current PU, (i, j) is the coordinate of pixels in $PU_c$, $(dv_x, dv_y)$ is the disparity vector of PUc. p(i, j) is the prediction of $PU_c$, r is the PU's reference picture from neighboring view. a and b are parameters of the linear IC model.

Figure 5B:
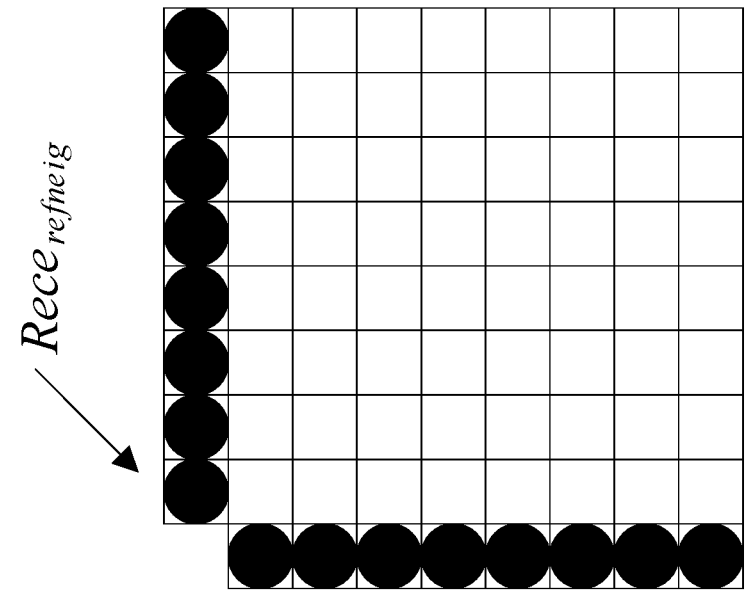
FIG. 5B is a block diagram illustrating the use of neighboring pixels of a reference block to estimate parameters in accordance with the IC model.
Figure 5A:
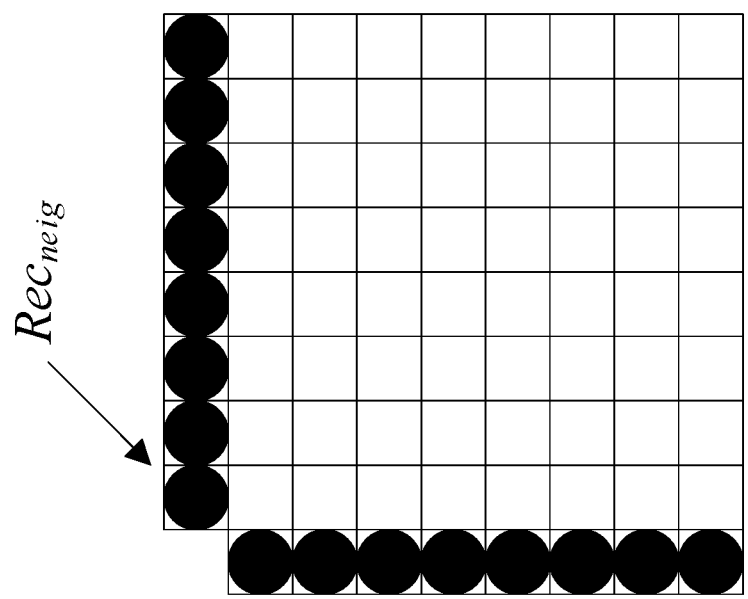
FIG. 5A is a block diagram illustrating the use of neighboring pixels of a current coding unit (CU) to estimate parameters in accordance with the illumination compensation (IC) model.

FIG. 5A is a block diagram illustrating the use of neighboring pixels of a CU to estimate parameters in accordance with the IC model. FIG. 5B is a block diagram illustrating the use of neighboring pixels of a reference block to estimate parameters in accordance with the IC model.

To estimate parameter a and b for a PU, a video coder may use two set of pixels. For example, FIG. 5A shows available reconstructed neighboring pixels (labeled as "$Rec_{neigh}$") in a left column of the current CU and the above row of the current CU (the CU that contains current PU). FIG. 5B shows corresponding neighboring pixels of the current CU's reference block (labeled as "$Rec_{refneigh}$"). A video coder may find a reference block of current CU by using a current PU's disparity vector.

Let $Rec_{neig}$ and $Rec_{refneig}$ denote used neighboring pixel set of current CU and the current CU's reference block respectively, and let 2N denote the pixel number in $Rec_{neig}$ and $Rec_{refneig}$. Then, a and b can be calculated as follows.

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad (2)$$

$$b = \frac{\sum_{i=0}^{2N-1} Rec_{neig}(i) - a \cdot \sum_{i=0}^{2N-1} Rec_{refneig}(i)}{2N} \quad (3)$$

In some examples, a is used in linear model and b is set equal to 0, or only b is used and a is set equal to 1.

In HEVC, Weighted Prediction (WP) is supported, where a scaling factor (denoted by a), a shift number (denoted by s) and an offset (denoted by b) is used in the motion compensation. Suppose the pixel value in position (x, y) of the reference picture be p(x, y), then p'(x, y)=((a*p(x, y)+(1<<(s−1)))>>s)+b instead of p(x, y) is used as the prediction value in motion compensation.

When WP is enabled, for each reference picture of current slice, a video encoder may signal a flag to indicate whether WP applies for the reference picture or not. If WP applies for one reference picture, video encoder 20 may send a set of WP parameters (i.e., a, s and b) to video decoder 30 and video decoder 30 may use the set of WP parameters for motion compensation from the reference picture. To flexibly turn on/off WP for luma and chroma component, video encoder 20 may separately signal a WP flag and WP parameters for luma and chroma components. In WP, a video coder may use one same set of WP parameters for all pixels in one reference picture.

Local Illumination Compensation (LIC) is based on a linear model for illumination changes, using a scaling factor a and an offset b. LIC may be enabled or disabled adaptively for each inter-mode coded coding unit (CU).

Figure 6B:
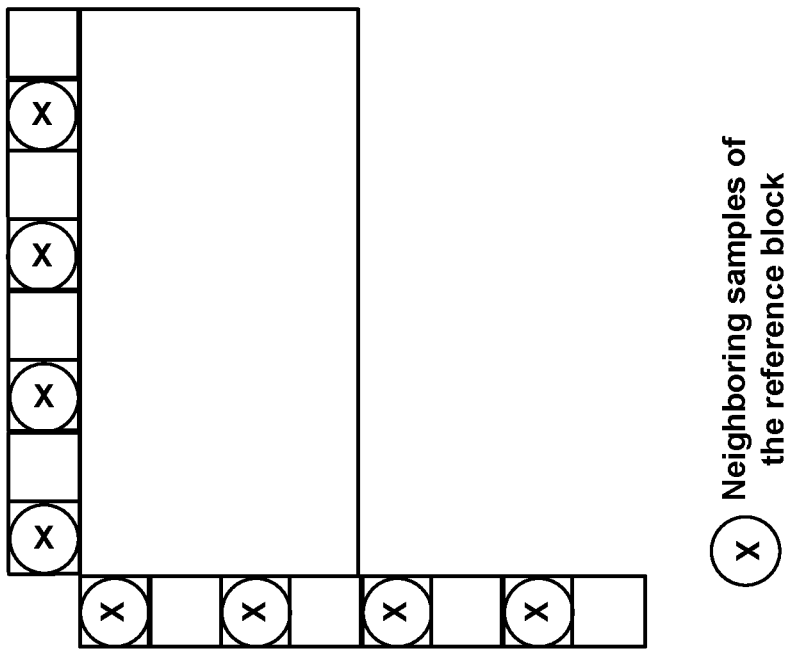
FIG. 6B is a block diagram illustrating a second example of neighboring samples used for deriving parameters for certain types of illumination compensation.
Figure 6A:
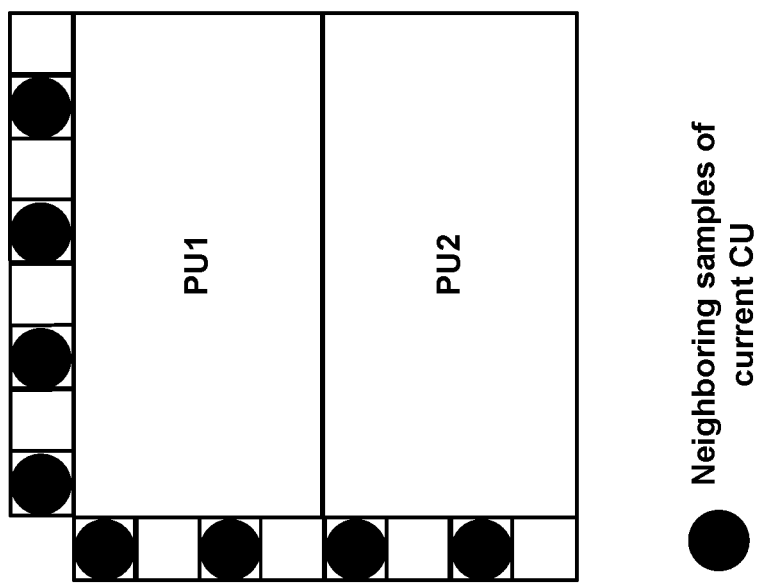
FIG. 6A is a block diagram illustrating a first example of neighboring samples used for deriving parameters for certain types of illumination compensation.

When LIC applies for a CU, a video coder may employ a least square error method to derive the parameters a and b by using the neighboring samples of the current CU and their corresponding reference samples. More specifically, in the example of FIG. 6A, a video coder may use the subsampled (2:1 sub sampling) neighboring samples of the CU. In this example, the video coder may use the corresponding pixels (identified by motion information of the current CU or sub-CU) in the reference picture as shown in FIG. 6B. The video coder may derive the IC parameters and may apply the IC parameters for each prediction direction separately.

When a CU is coded with merge mode, a video coder may copy the LIC flag from neighboring blocks, in a way similar to motion information copy in merge mode; otherwise, video encoder 20 may signal an LIC flag for the CU to indicate whether LIC applies or not.

In some LIC algorithms, for each prediction direction, a video coder may utilize one linear model to derive the prediction block. However, for some blocks, the illumination changes may be different from sample to sample even within one block.

For each block, when LIC is enabled, a video coder may apply the linear model to all samples within the block. It is possible that for some region within the block, the linear model may fail since the mode of LIC typically represents the majority content changes information of one block, but not suitable for all samples.

LIC takes neighboring information to derive the linear model parameters, however, there could be minor difference between the optimal parameters (derived from the current block and reference block) and the derived parameters (from the neighboring blocks).

To help to solve the aforementioned, the following techniques are proposed. The following does not necessarily have to solve the issues in all cases, and also, the techniques may be beneficial for other reasons as well.

The following techniques may be applied individually. Alternatively, any combination of them may be applied. Reference index information may be regarded as a part of motion information in this disclosure, sometimes they are jointly referred to as a set of motion information. The following techniques may be applied to each reference picture list separately, or multiple reference picture lists together.

A video coder (e.g., video encoder 20 and/or video decoder 30) may be configured to apply multiple model LIC (MMLIC) to use more than one linear model between the neighboring luma block of the reference block and the neighboring luma block of the current block in a coding block/coding unit (CU)/transform unit (TU). Video encoder 20 and/or video decoder 30 may classify a neighboring luma block of the reference block and a neighboring luma block of the current block into several groups. In this example, video encoder 20 and/or video decoder 30 may use each group as a training set to derive a linear model (e.g., particular and/or are derived for a certain group). Additionally, or alternatively, video encoder 20 and/or video decoder 30 may classify samples within a current block into several groups. In this example, video encoder 20 and/or video decoder 30 may pick one linear model from each group.

Video encoder 20 and/or video decoder 30 may classify the samples of the reference block based on the same rule for the classification of neighboring samples. Video encoder 20 and/or video decoder 30 may apply one of the multiple linear models to a sample of the reference block to generate the prediction value associated with the corresponding coordinator.

Video encoder 20 and/or video decoder 30 may apply each linear model to the current reference block to get one prediction block. In this example, video encoder 20 and/or video decoder 30 may utilize a plurality (including all) of the prediction blocks obtained from multiple linear models to get the final prediction block. Video encoder 20 and/or video decoder 30 may restrict neighboring luma samples in a group. Said differently, for example, video encoder 20 and/or video decoder 30 may restrict luma samples of the neighboring luma block of the reference block and luma samples of the neighboring luma block of the current block in a group of the plurality of groups such that a number of samples in the group satisfies (e.g., is less than, is greater than, equals, etc.) a specific number of samples. For example, video encoder 20 and/or video decoder 30 may restrict the number of samples in a group after the classification is larger than or equal to a specific number, such as, for example, but not limited to, 2. In some examples, the least number of samples in one classification may be pre-defined and video encoder 20 and/or video decoder 30 may use the same value for all block size. Alternatively, or additionally, the least number of samples in one classification may be variant, depending on the size of the current block, and/or any other features. Alternatively, or additionally, video encoder 20 may signal the least number of samples in one classification in sequence parameter set (SPS)/view parameter set (VPS)/picture parameter set (PPS)/slice header.

If the number of samples in a group is smaller than the specific number, video encoder 20 and/or video decoder 30 may transfer samples in other groups with more samples to this group. For example, video encoder 20 and/or video decoder 30 may change a sample in the group with the most samples to the group with samples less than the specific number.

Video encoder 20 and/or video decoder 30 may change a sample in the group (e.g., named group A) with the most samples to the group (e.g., named group B) with samples less than the specific number if the sample is the nearest sample to the existing sample in group B. "Nearest" may refer to the nearest in pixel position. In some examples, nearest may refer to the nearest intensity. Alternatively, or additionally, the specific number may be dependent on the width and/or height of the coding block.

Video encoder 20 and/or video decoder 30 may be configured to perform a classification of neighboring luma samples. For example, video encoder 20 and/or video decoder 30 may perform a classification of samples (e.g., either neighboring samples of the current block or neighboring samples of the reference block, or samples in the reference block or samples in the current block) based on their intensities of the samples and/or positions of the samples. In some examples, video encoder 20 may signal the classification techniques.

Video encoder 20 and/or video decoder 30 may be configured such that the number of classes are pre-defined and fixed for all sequences. Alternatively, or additionally, video encoder 20 may signal the number of classes in a SPS/VPS/PPS/slice header/CU/PU. Alternatively, or additionally, video encoder 20 and/or video decoder 30 may be configured such that the number of classes are dependent on the block size, e.g., width and/or height of the current luma block.

Video encoder 20 and/or video decoder 30 may be configured to derive M classes for MMLIC is given as follows.

$$\begin{cases} Pred_L[x, y] = \alpha_1 \cdot Rec'_L[x, y] + \beta_1 & \text{if } Rec'_L[x, y] \le T_1 \\ Pred_L[x, y] = \alpha_2 \cdot Rec'_L[x, y] + \beta_2 & \text{if } T_1 < Rec'_L[x, y] \le T_2 \\ \quad \cdots & \quad \cdots \\ Pred_L[x, y] = \alpha_m \cdot Rec'_L[x, y] + \beta_m & \text{if } T_{m-1} < Rec'_L[x, y] \le T_m \\ \quad \cdots & \quad \cdots \\ Pred_L[x, y] = \alpha_M \cdot Rec'_L[x, y] + \beta_M & \text{if } T_{M-1} < Rec'_L[x, y] \end{cases}$$

Wherein $Rec'_L[x, y]$ represents a reference sample with the same relative position (x, y) to the reference block which is equal to r(x+dv$_x$, y+dv$_y$) in equation (1), and a neighboring sample with T$_{m-1}$<Rec$'_L$[x,y]≤T$_m$ is classified into the m-th group (wherein m is from 1 to M, inclusively).

Video encoder 20 and/or video decoder 30 may define T$_{-1}$ as a negative value, e.g., −1. In some examples, video encoder 20 and/or video decoder 30 may signal the (M−1) thresholds denoted by (T$_1$ . . . T$_{M-1}$) to video decoder 30. Alternatively, or additionally, video encoder 20 and/or video decoder 30 may calculate the thresholds depending on all or partial of the neighboring coded samples of the reference block, or/and the decoded samples in the reference block or the neighboring samples of the current block.

Video encoder 20 and/or video decoder 30 may be configured such that the Threshold (denoted by T$_i$ in above formulas) is dependent on the average or median value of the neighboring coded (also be donated as 'reconstructed') samples.

Video encoder 20 and/or video decoder 30 may be configured such that the threshold may be dependent on the average of minV and maxV, wherein minV and maxV are the minimum value and the maximum values respectively of the neighboring coded samples.

Video encoder 20 and/or video decoder 30 may be configured such that the threshold may be dependent on the average or media value of the neighboring coded samples of the reference block and the samples in the reference block.

Video encoder 20 and/or video decoder 30 may be configured such that the threshold may be dependent on the average of minV and maxV, wherein minV and maxV are the minimum value and the maximum values respectively of the neighboring coded samples of the reference block and the coded samples in the reference block.

Selection of linear models is discussed in the following. When MMLIC is enabled, video encoder 20 and/or video decoder 30 may classify the current block into multiple groups and the rule for the classification may be the same as those used for linear model derivation, such as average/median.

Suppose there are M categories for both current block, and M derived linear models. Video encoder 20 and/or video decoder 30 may choose the linear model with the same index as the category index associated with one sample to generate the prediction value of the sample.

When generating the prediction value for a sample, in addition to the selected linear model, video encoder 20 and/or video decoder 30 may utilize the sample located in the reference block with the same relative position. Alternatively, or additionally, when the current sample and the sample located in the reference block with the same relative position are not classified into the same category, instead of using the sample located in the reference block with the same relative position, video encoder 20 and/or video decoder 30 may use other samples with the same category to generate the prediction value of current sample.

Figure 7:
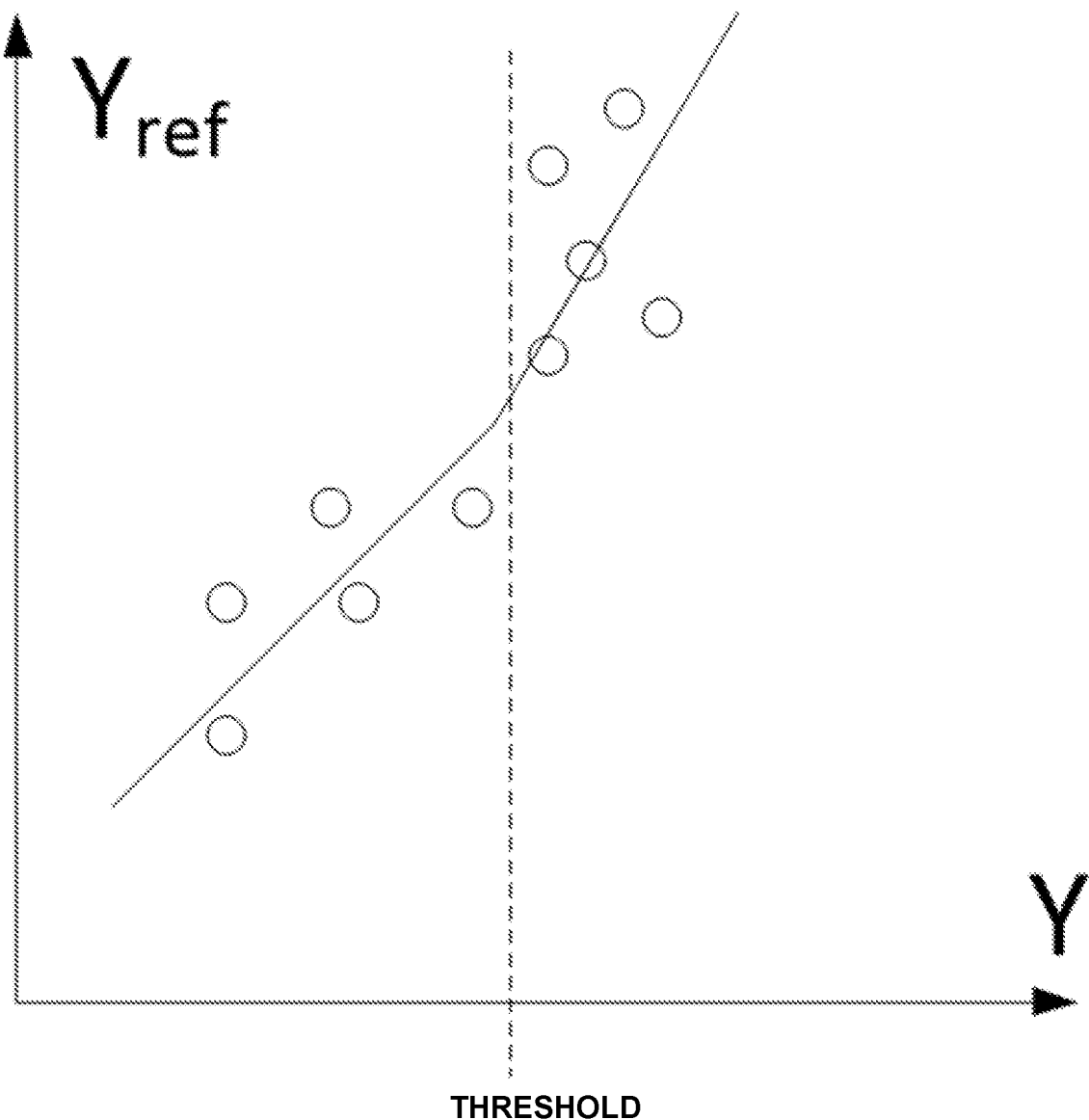
FIG. 7 is a graphical illustration of an example of classifying the neighboring samples into two groups.
Figure 8:
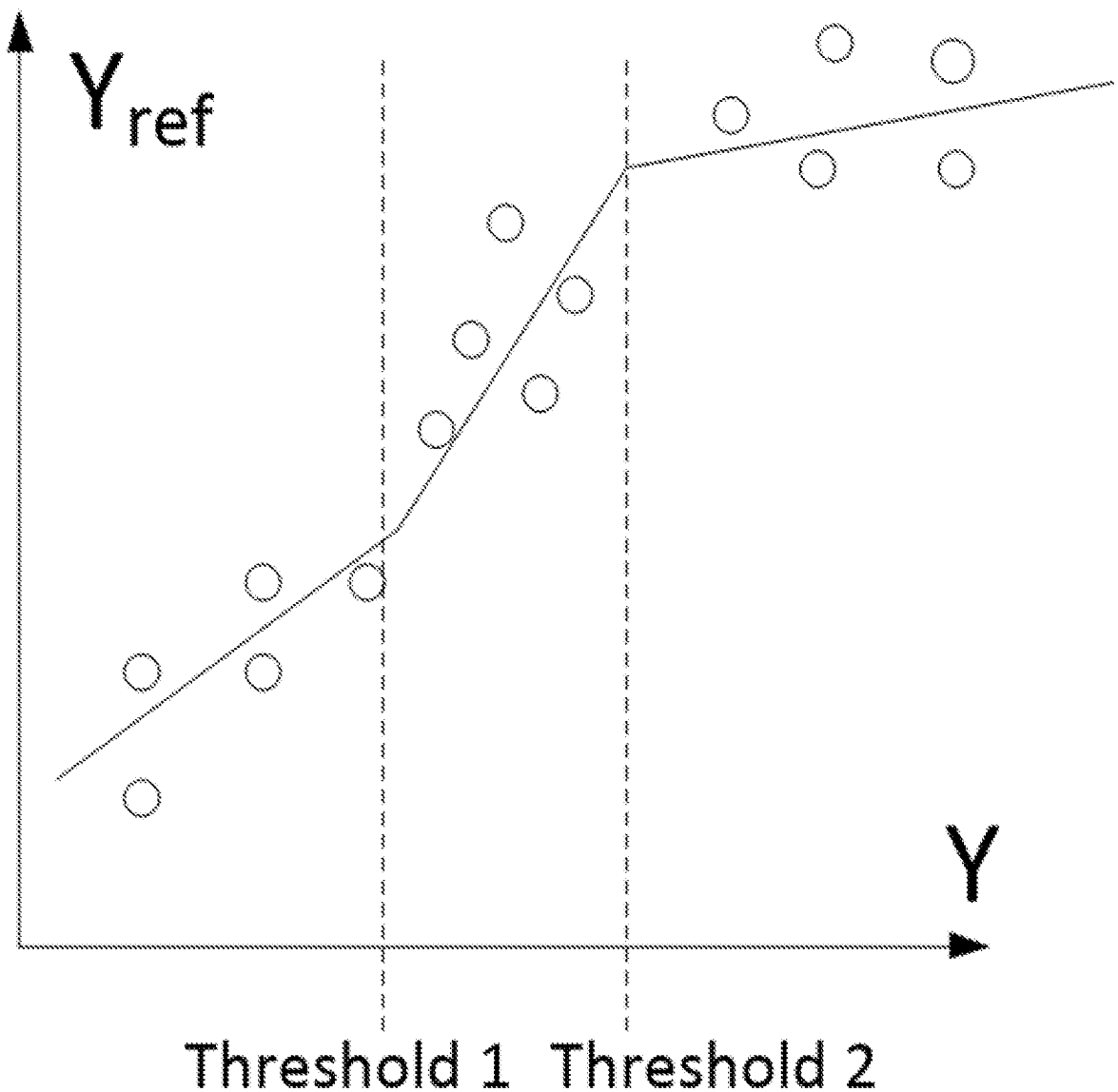
FIG. 8 is a graphical illustration of an example of classifying the neighboring samples into three groups.

Video encoder 20 and/or video decoder 30 may be configured such that the derived linear relationships (e.g., represented as lines in the figures) of each group may be continuous piece-wise, such as in FIG. 7 and FIG. 8, where in FIG. 7

$$\alpha_1 \cdot Rec'_L[x,y] + \beta_1 = \alpha_2 \cdot Rec'_L[x,y] + \beta_2 \text{ if } Rec'_L[x,y] = \text{Threshold} \quad (8)$$

and, in FIG. 8, $$\begin{cases} \alpha_1 \cdot Rec'_L[x, y] + \beta_1 = \alpha_2 \cdot Rec'_L[x, y] + \beta_2 & \text{if } Rec'_L[x, y] = Threshold1 \\ \alpha_2 \cdot Rec'_L[x, y] + \beta_2 = \alpha_3 \cdot Rec'_L[x, y] + \beta_3 & \text{if } Rec'_L[x, y] = Threshold2 \end{cases} \quad (9)$$

Figure 9B:
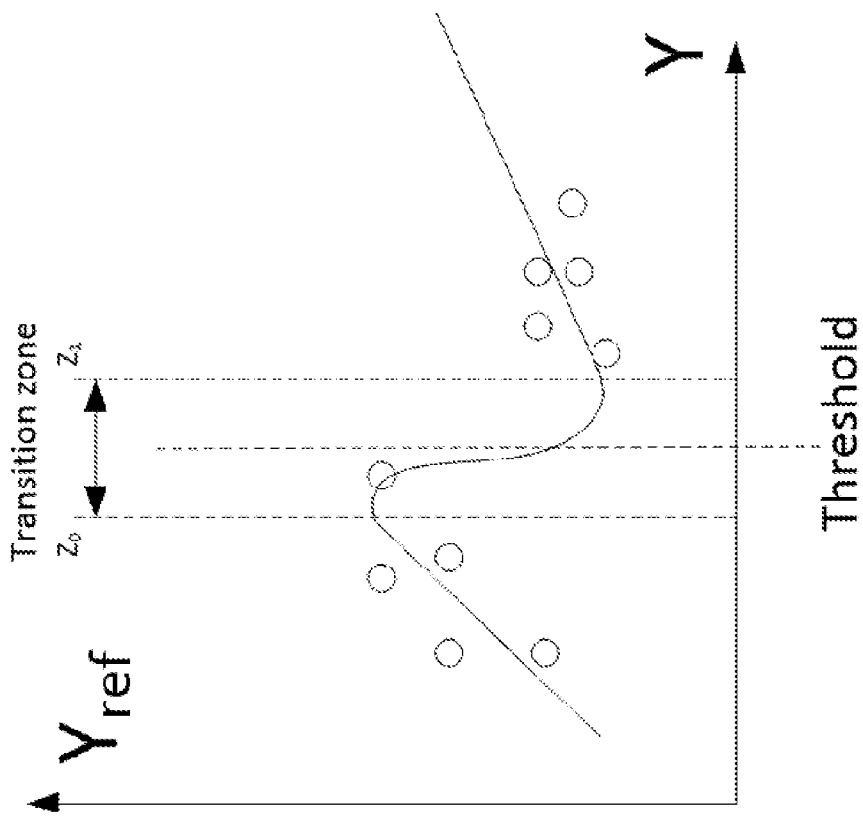
FIGS. 9A and 9B are graphical illustrations of example of classifying the neighboring samples into two groups, non-continuous.
Figure 9A:
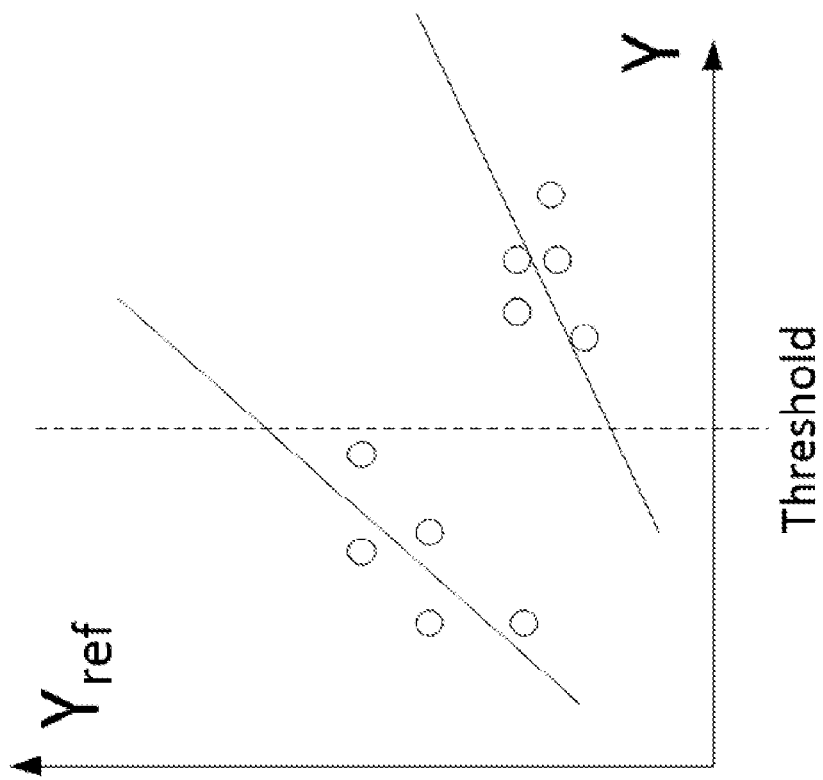
Figure 10:
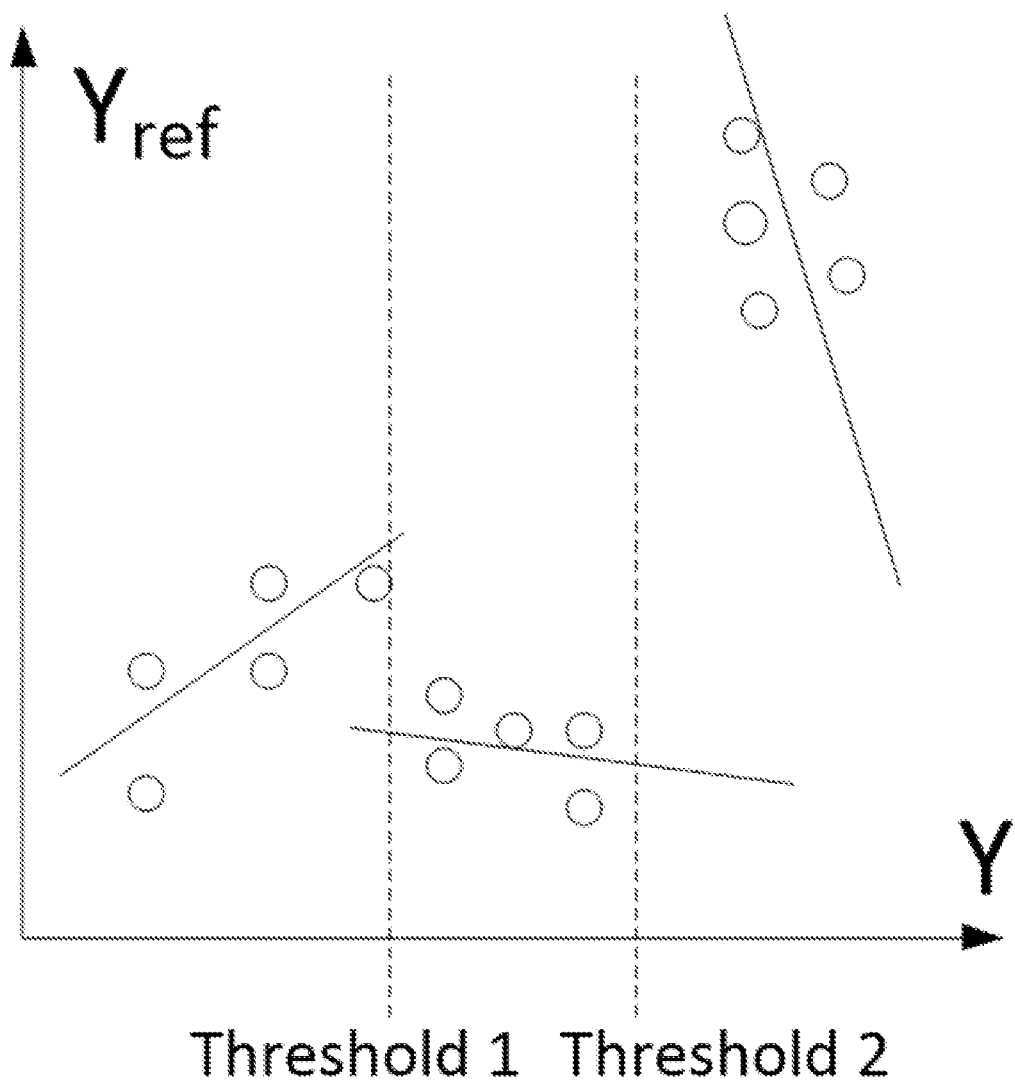
FIG. 10 is a graphical illustration of an example of classifying the neighboring samples into three groups, non-continuous.

Video encoder 20 and/or video decoder 30 may be configured such that the derived linear relationships (representing as lines in the figures) of each group may be non-continuous piece-wise as in FIG. 9A and FIG. 10, where in FIG. 9A, $$\alpha_1 \cdot Rec'_L[x,y] + \beta_1 \neq \alpha_2 \cdot Rec'_L[x,y] + \beta_2 \text{ if } Rec'_L[x,y] = \text{Threshold} \quad (10)$$

and, in FIG. 9B, $$\begin{cases} \alpha_1 \cdot Rec'_L[x, y] + \beta_1 \neq \alpha_2 \cdot Rec'_L[x, y] + \beta_2 & \text{if } Rec'_L[x, y] = Threshold1 \\ \alpha_2 \cdot Rec'_L[x, y] + \beta_2 \neq \alpha_3 \cdot Rec'_L[x, y] + \beta_3 & \text{if } Rec'_L[x, y] = Threshold2 \end{cases} \quad (11)$$

FIG. 7 is an example of classifying the neighboring samples into two groups. FIG. 8 is an example of classifying the neighboring samples into three groups. FIGS. 9A and 9B represent an example of classifying the neighboring samples into two groups, non-continuous. FIG. 9B illustrates a transition zone based on the samples in FIG. 9A. FIG. 10 is an example of classifying the neighboring samples into three groups, non-continuous.

With MMLIC, video encoder 20 and/or video decoder 30 may use more neighboring samples (e.g., more lines instead of just one above row and one left column) to derive the linear-models for LIC. Said differently, for example, video encoder 20 and/or video decoder 30 may be configured to derive a plurality of linear models using one or more of a luma sample of the neighboring luma block of the reference block that is arranged more than one row above the reference block, a luma sample of the neighboring luma block of the reference block that is arranged more than one column left of the reference block, a luma sample of the neighboring luma block of the current block that is arranged more than one row above the current block, or a luma sample of the current luma block of the reference block that is arranged more than one column left of the current block. In some examples, video encoder 20 and/or video decoder 30 may use a down-sampled version of multiple lines.

Instead of always performing LIC for a whole block, video encoder 20 and/or video decoder 30 may use a sub-block control. In some examples, video encoder 20 and/or video decoder 30 may be configured such that a sub-block indicates a region which is smaller than the current block. In some examples, video encoder 20 and/or video decoder 30 may split one block into multiple regions (sub-blocks) with equal sizes. Alternatively, or additionally, video encoder 20 and/or video decoder 30 may split one block into multiple sub-blocks with different sizes.

Video encoder 20 and/or video decoder 30 may be configured such that, when MMLIC is utilized, for a certain linear model, video encoder 20 and/or video decoder 30 are allowed to pre-set the related parameters (e.g., set a=1 and b=0). That is, for a certain group, video encoder 20 and/or video decoder 30 may disable LIC.

In some examples, for each sub-block, video encoder 20 and/or video decoder 30 may derive the enabling/disabling flag of LIC based on existing information, such as, for example, but not limited to, sample differences between current sub-block and its reference sub-block, or how similar between current sub-block, and the whole block like the differences between average value of a sub-block and the whole block. In some examples, video encoder 20 may signal flags for indications of sub-block enabling/disabling.

In some examples, video encoder 20 and/or video decoder 30 may code the flags as whether it is identical to the flag signaled/inherited for the coding block. In some examples, video encoder 20 and/or video decoder 30 may inherit the enabling/disabling flags of the reference blocks by the current block.

For a block with bi-prediction, for one prediction direction, video encoder 20 and/or video decoder 30 may enable LIC and video encoder 20 and/or video decoder 30 may disable LLC for the other direction. In some examples, for a block with bi-prediction, video encoder 20 and/or video decoder 30 may apply multiple LIC to each prediction direction individually to generate separate prediction blocks, and video encoder 20 and/or video decoder 30 may generate the final prediction block of the current block by the separate prediction blocks. In some examples, for a block with bi-prediction, video encoder 20 and/or video decoder 30 may jointly consider the neighboring samples of multiple reference blocks (e.g., for the two prediction directions) to derive LIC or MMLIC parameters. Alternatively, or additionally, video encoder 20 and/or video decoder 30 may apply the LIC or MMLIC to the multiple reference blocks to derive the final prediction block.

Video encoder 20 may signal parameters of LIC and/or MMLIC (e.g., such as a and b) instead of deriving parameters of LIC and/or MMLIC from neighboring samples. In some examples, video encoder 20 may signal the optimal parameters derived from the original current block and its reference blocks after quantization of a and b. Alternatively, or additionally, video encoder 20 may signal one flag to indicate whether to use the explicitly signaling (such as 4.a) or an implicitly signaling technique. The above techniques may be applicable to the signaling of LM linear parameters.

Video encoder 20 and/or video decoder 30 may apply different subsampling ratios (e.g., instead of always using 2:1 subsampling) to the neighboring samples. In some examples, video encoder 20 may signal the subsampling ratio in SPS/VPS/PPS/Slice header. In some examples, video encoder 20 and/or video decoder 30 may be configured such that the subsampling ratio may be pre-defined and fixed for all blocks. In some examples, video encoder 20 and/or video decoder 30 may be configured such that the subsampling ratio may be variable, such as dependent on the block size, and/or whether the motion vector pointing an integer position or sub-sample position.

For pictures with more than one component, e.g. a picture with Y/Cb/Cr components, video encoder 20 and/or video decoder 30 may apply multiple-model LIC to only one or two specified components. For example, video encoder 20 and/or video decoder 30 may apply a multiple-model LIC to the Y component. Video encoder 20 and/or video decoder 30 may apply a multiple-model LIC to all components (e.g., more than one component). Video encoder 20 and/or video decoder 30 may be configured such that different components follow different rules when applying multiple-model LIC. For example, video encoder 20 and/or video decoder 30 may classify a Y component block into more groups than the corresponding Cb/Cr component blocks.

Using one or more techniques described herein for applying multiple linear models, video encoder 20 and/or video decoder 30 may be configured to derive a prediction block for a current block with less error compared to systems that use a single linear model to derive a prediction block. For example, video encoder 20 and/or video decoder 30 may be configured to classify luma samples of a neighboring luma block of a reference block and luma samples of a neighboring luma block of a current block into a plurality of groups, derive one or more local illumination compensation parameters for each group of the plurality of groups to generate a plurality of local illumination compensation parameters for the current block, derive a plurality of linear models between the neighboring luma block of the reference block and the neighboring luma block of the current block using the plurality of local illumination compensation parameters for the current block, and generate a prediction block using the plurality of linear models. Reducing error in the prediction block may reduce an amount of residual data transmitted in a bitstream output by a video encoder and received by a video decoder to improve a compression rate of the video data transmitted, which may improve a processing speed of video encoder 20 and/or video decoder 30 and/or reduce a power consumption of video encoder 20 and/or video decoder 30.

Figure 11:
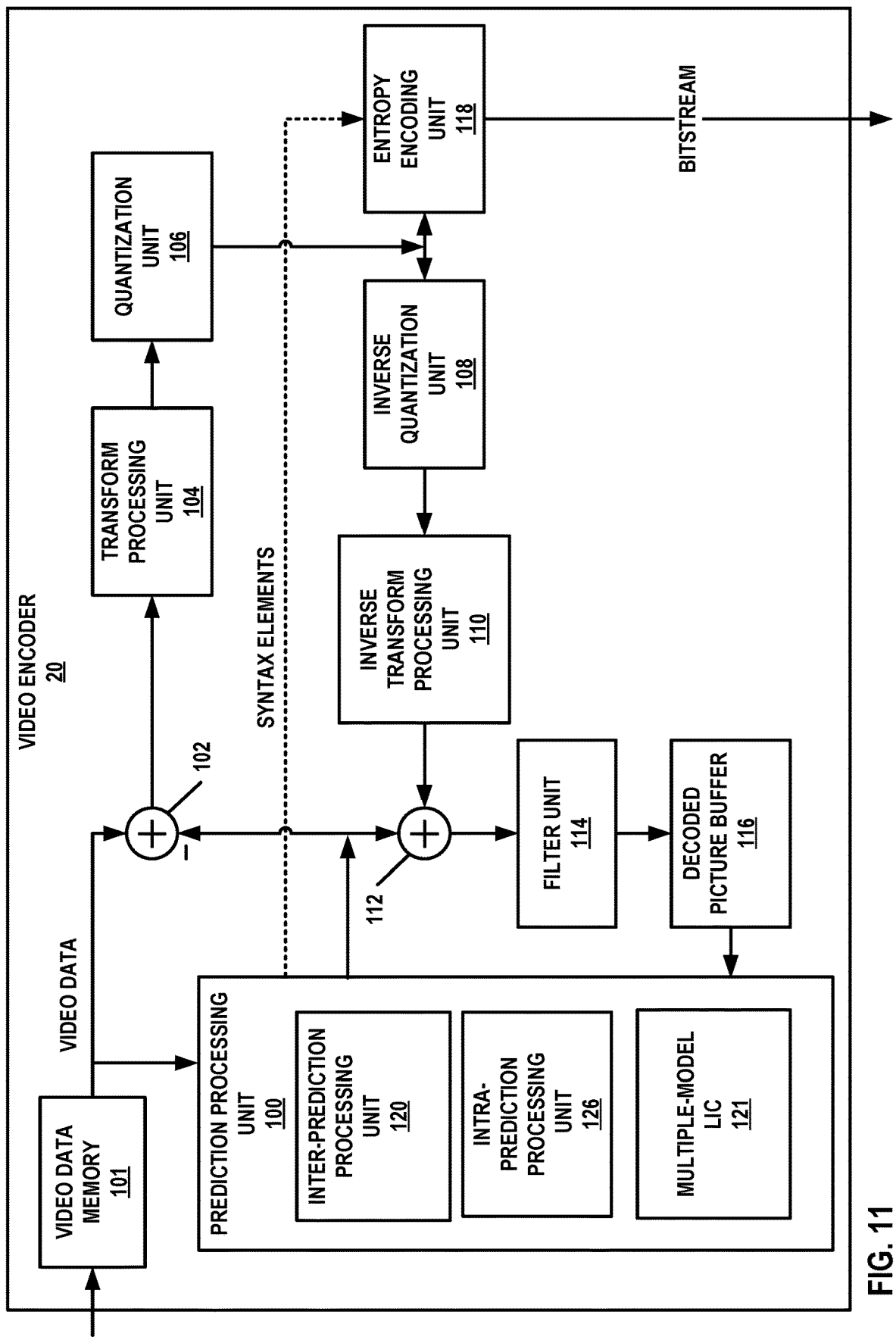
FIG. 11 is a block diagram illustrating an example video encoder that may implement one or more techniques described in this disclosure.

FIG. 11 is a block diagram illustrating an example video encoder 20 that may implement the techniques of this disclosure. FIG. 11 is provided for purposes of explanation and should not be considered limiting of the techniques as broadly exemplified and described in this disclosure. The techniques of this disclosure may be applicable to various coding standards or methods. Video encoder 20 will be described in the context of HEVC coding and VVC for purposes of illustration, but without limitation of this disclosure as to other coding standards or methods. For example, video encoder 20 may operating according to future video coding standards, including H.266 and VVC.

In the example of FIG. 11, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 28 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU. JEM/VVC also provides an affine motion compensation mode, which may be considered an inter-prediction mode.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Multiple-model LIC 121 of Prediction processing unit 100 may classify luma samples into groups, derive LIC parameters, and derive linear models using the LIC parameters. Prediction processing unit 100 (e.g., inter-prediction processing unit 120) may generate a prediction block using the linear models derived by multiple-model LIC 121.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

Video encoder 20 represents an example of a device configured to encode video data including a memory configured to store video data, and one or more processing units implemented in circuitry and configured to classify luma samples of a neighboring luma block of a reference block and luma samples of a neighboring luma block of a current block into a plurality of groups, derive one or more local illumination compensation parameters for each group of the plurality of groups to generate a plurality of local illumination compensation parameters for the current block, derive a plurality of linear models between the neighboring luma block of the reference block and the neighboring luma block of the current block using the plurality of local illumination compensation parameters for the current block, and generate a prediction block using the plurality of linear models.

Figure 12:
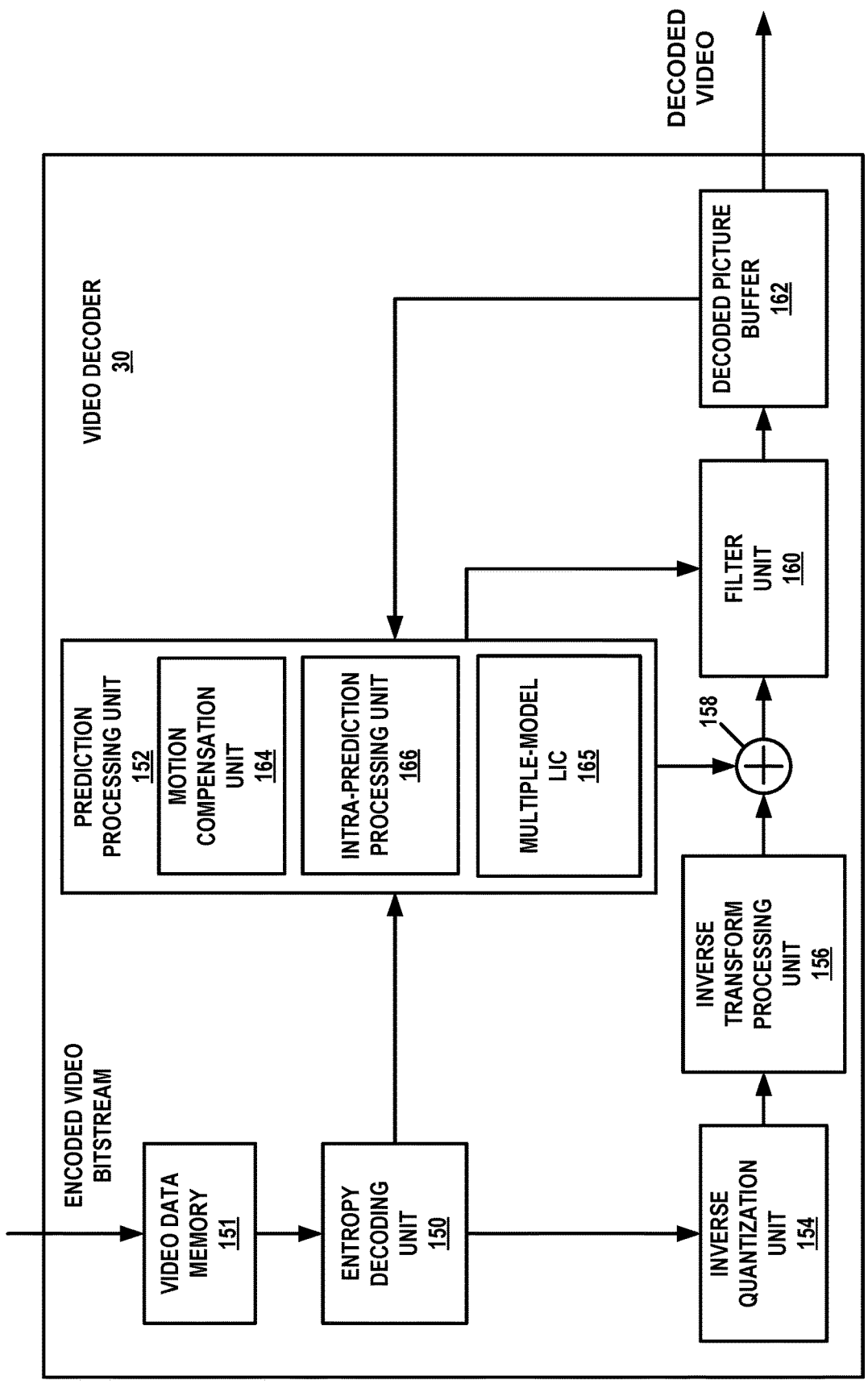
FIG. 12 is a block diagram illustrating an example video decoder that may implement one or more techniques described in this disclosure.

FIG. 12 is a block diagram illustrating an example video decoder 30 that is configured to implement the techniques of this disclosure. FIG. 12 is provided for purposes of explanation and is not limiting on the techniques as broadly exemplified and described in this disclosure. For purposes of explanation, this disclosure describes video decoder 30 in the context of HEVC coding and VVC. However, the techniques of this disclosure may be applicable to other coding standards or methods.

In the example of FIG. 12, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

Multiple-model LIC 165 of Prediction processing unit 152 may classify luma samples into groups, derive LIC parameters, and derive linear models using the LIC parameters. Prediction processing unit 152 (e.g., motion compensation unit 164) may generate a prediction block using the linear models derived by multiple-model LIC 165.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

In this manner, video decoder 30 represents an example of a video decoding device including a memory configured to store video data, and one or more processing units implemented in circuitry and configured to classify luma samples of a neighboring luma block of a reference block and luma samples of a neighboring luma block of a current block into a plurality of groups, derive one or more local illumination compensation parameters for each group of the plurality of groups to generate a plurality of local illumination compensation parameters for the current block, derive a plurality of linear models between the neighboring luma block of the reference block and the neighboring luma block of the current block using the plurality of local illumination compensation parameters for the current block, and generate a prediction block using the plurality of linear models.

Figure 13:
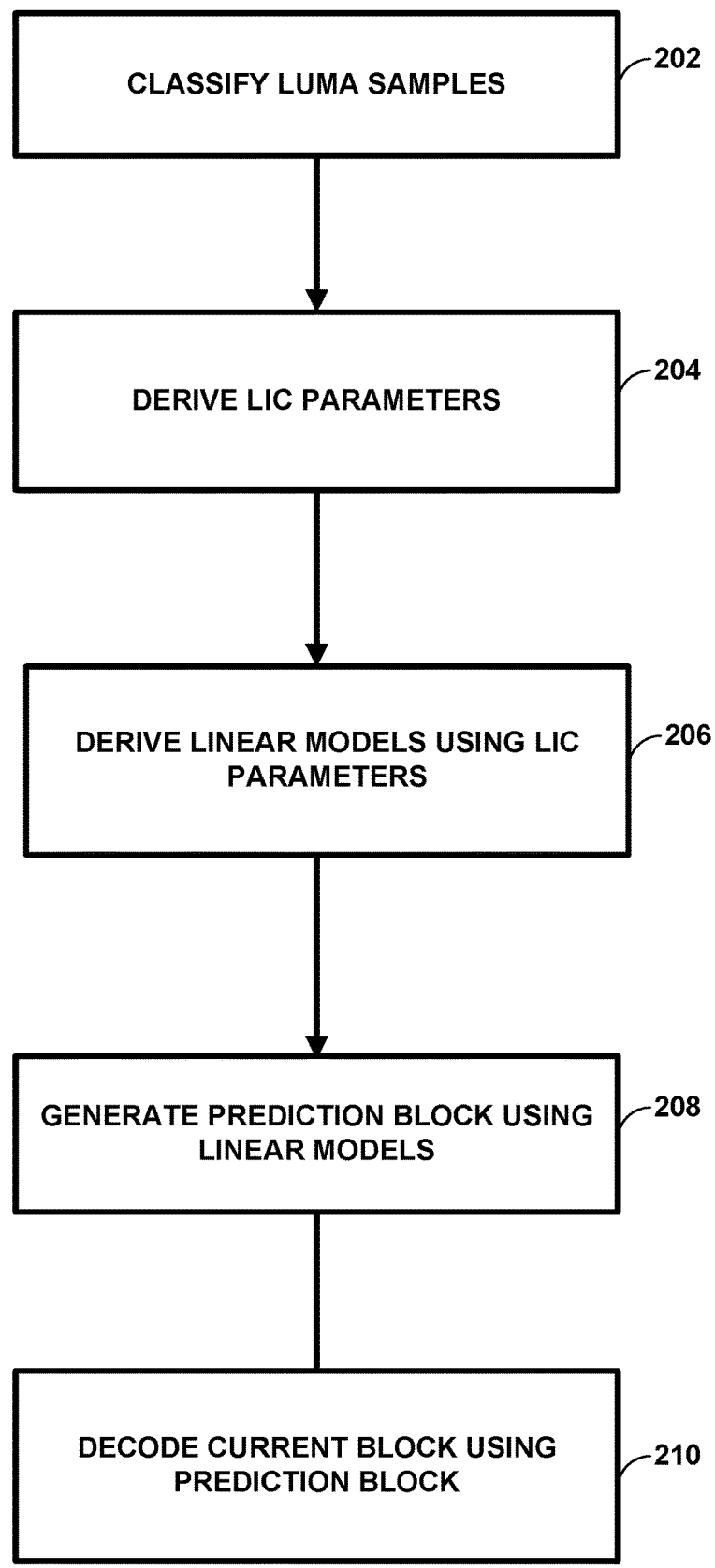
FIG. 13 is a flowchart illustrating techniques for decoding video data using local illumination compensation with multiple linear models.

FIG. 13 is a flowchart illustrating techniques for decoding video data using local illumination compensation with multiple linear models. The current block may include a current CU or a portion of the current CU. Although described with respect to video decoder 30, it should be understood that other devices may be configured to perform a method similar to that of FIG. 13.

In the example of FIG. 13, multiple-model LIC 165 classifies luma samples (202). For example, multiple-model LIC 165 classified a neighboring luma block of a reference block and luma samples of a neighboring luma block of a current block into a plurality of groups. Multiple-model LIC 165 derives LIC parameters (204). For example, multiple-model LIC 165 derives one or more local illumination compensation parameters for each group of the plurality of groups to generate a plurality of local illumination compensation parameters for the current block. Multiple-model LIC 165 derives linear models using the LIC parameters (206). For example, multiple-model LIC 165 derives a plurality of linear models between the neighboring luma block of the reference block and the neighboring luma block of the current block using the plurality of local illumination compensation parameters for the current block. Prediction processing unit 152 generates a prediction block using the linear models (208). Video decoder 30 decodes the current block using the prediction block (210).

Figure 14:
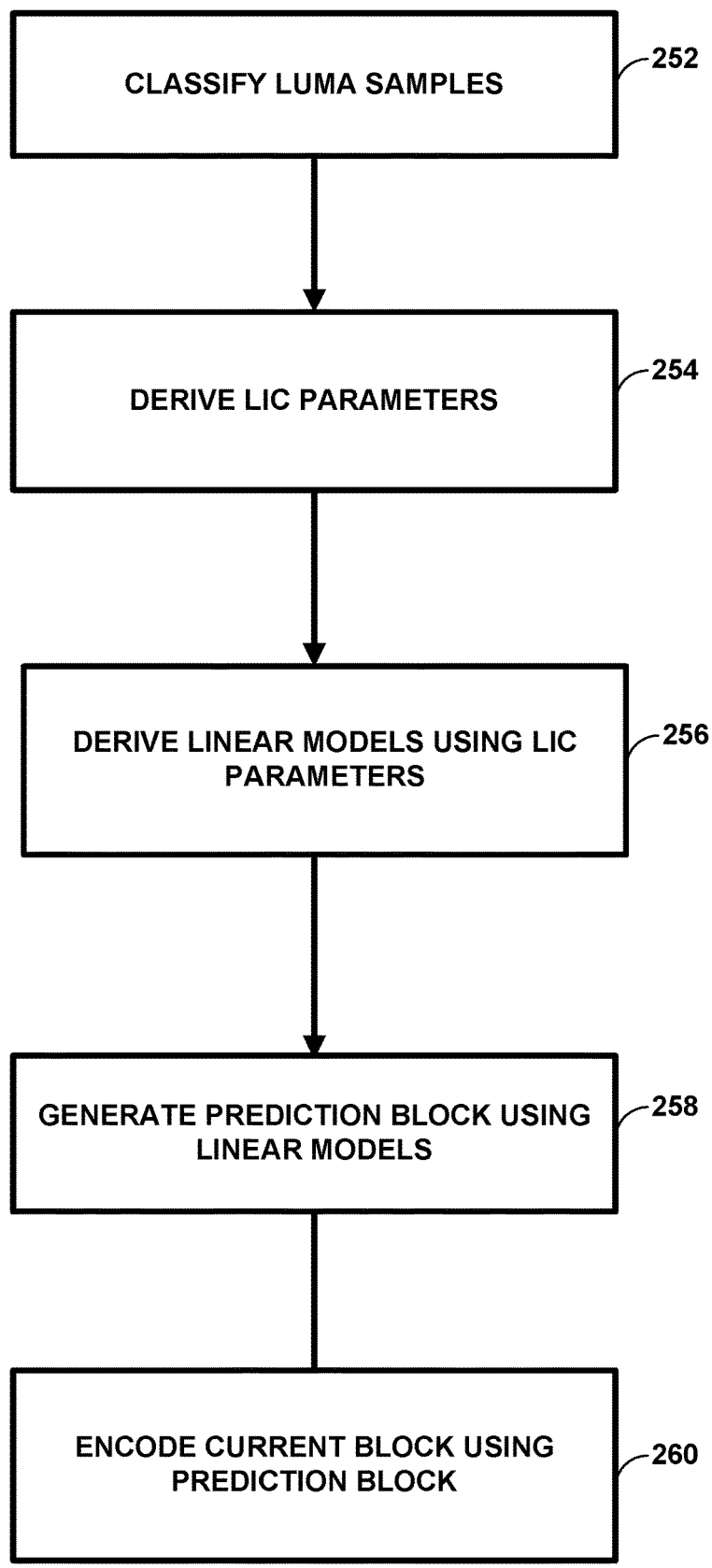
FIG. 14 is a flowchart illustrating techniques for encoding video data using local illumination compensation with multiple linear models.

FIG. 14 is a flowchart illustrating techniques for encoding video data using local illumination compensation with multiple linear models. The current block may include a current CU or a portion of the current CU. Although described with respect to video encoder 20, it should be understood that other devices may be configured to perform a method similar to that of FIG. 14.

In the example of FIG. 14, multiple-model LIC 121 classifies luma samples (252). For example, multiple-model LIC 121 classified a neighboring luma block of a reference block and luma samples of a neighboring luma block of a current block into a plurality of groups. Multiple-model LIC 121 derives LIC parameters (254). For example, multiple-model LIC 121 derives one or more local illumination compensation parameters for each group of the plurality of groups to generate a plurality of local illumination compensation parameters for the current block. Multiple-model LIC 121 derives linear models using the LIC parameters (256). For example, multiple-model LIC 121 derives a plurality of linear models between the neighboring luma block of the reference block and the neighboring luma block of the current block using the plurality of local illumination compensation parameters for the current block. Prediction processing unit 100 generates a prediction block using the linear models (258). Video encoder 20 encodes the current block using the prediction block (260).

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by fixed function and/or programmable processing circuitry, including one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of processing video data, the method comprising:

classifying, by processing circuitry, first luma samples of a neighboring luma block of a reference block and second luma samples of a neighboring luma block of a current block into a plurality of groups, wherein each one of the plurality of groups is each associated with one or more of a range of intensities or a range of positions, wherein classifying comprise classifying two or more luma samples using one or more of intensities of the two or more luma samples or positions of the two or more luma samples, and wherein classifying comprises restricting the first luma samples of the neighboring luma block of the reference block and the second luma samples of the neighboring luma block of the current block in a group of the plurality of groups such that a number of samples in the group satisfies a specific number of samples;

deriving, by the processing circuitry, one or more local illumination compensation parameters for each group of the plurality of groups that are each associated with the one or more of the range of intensities or the range of positions to generate a plurality of local illumination compensation parameters for the current block;

deriving, by the processing circuitry, a plurality of linear models between the neighboring luma block of the reference block and the neighboring luma block of the current block using the plurality of local illumination compensation parameters for the current block; and generating, by the processing circuitry, a prediction block using the plurality of linear models.

2. The method of claim 1, wherein deriving the one or more local illumination compensation parameters comprises deriving a and/or b for a respective group of the plurality of groups, $$\text{wherein } a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneign}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2},$$

$$\text{wherein } b = \frac{\sum_{i=0}^{2N-1} Rec_{neig}(i) - a \cdot \sum_{i=0}^{2N-1} Rec_{refneig}(i)}{2N},$$

wherein $Rec_{neig}$ denotes the second luma samples of the neighboring luma block of the current block, wherein $Rec_{refneig}$ denotes the first luma samples of the neighboring luma block of the reference block, and wherein N denotes a pixel number in $Rec_{neig}$ and $Rec_{refneig}$.

3. The method of claim 1, wherein deriving the plurality of linear models comprises:
deriving linear relationships of each group of the plurality of groups to be continuous piece-wise.

4. The method of claim 1, wherein deriving the plurality of linear models comprises:
deriving linear relationships of each group of the plurality of groups to be non-continuous piece-wise.

5. The method of claim 1, wherein deriving the plurality of linear models comprises:
deriving the plurality of linear models using one or more of a first luma sample of the first luma samples of the neighboring luma block of the reference block that is arranged more than one row above the reference block, a second luma sample of the first luma samples of the neighboring luma block of the reference block that is arranged more than one column left of the reference block, a third luma sample of the second luma samples of the neighboring luma block of the current block that is arranged more than one row above the current block, or a fourth luma sample of the second luma samples of the current luma block of the reference block that is arranged more than one column left of the current block.

6. The method of claim 1, wherein generating the prediction block comprises:
performing local illumination compensation for a sub-block of the current block.

7. The method of claim 1, further comprising:
performing, by the processing circuitry, bi-prediction using the prediction block.

8. The method of claim 1, further comprising:
signaling, by the processing circuitry, one or more parameters for local illumination compensation, wherein deriving the one or more local illumination compensation parameters for each group is based on the one or more parameters for local illumination compensation.

9. The method of claim 1, further comprising:
applying, by the processing circuitry, different subsampling ratios to the first luma samples of the neighboring luma block of the reference block and the second luma samples of the neighboring luma block of the current block.

10. The method of claim 1, wherein deriving the plurality of linear models comprises:
applying local illumination compensation to only one or two specified components.

11. The method of claim 1, wherein deriving the plurality of linear models comprises:
applying local illumination compensation to all components.

12. The method of claim 1, further comprising:
decoding, by the processing circuitry, the current block using the prediction block.

13. The method of claim 1, further comprising:
encoding, by the processing circuitry, the current block using the prediction block.

14. An apparatus for processing video data comprising:
one or more storage media configured to store video data; and
one or more processors configured to:
classify first luma samples of a neighboring luma block of a reference block and second luma samples of a neighboring luma block of a current block into a plurality of groups, wherein each one of the plurality of groups is each associated with one or more of a range of intensities or a range of positions, wherein, to classify, the one or more processors are configured to classify two or more luma samples using one or more of intensities of the two or more luma samples or positions of the two or more luma samples, and wherein, to classify, the one or more processors are configured to restrict the first luma samples of the neighboring luma block of the reference block and the second luma samples of the neighboring luma block of the current block in a group of the plurality of groups such that a number of samples in the group satisfies a specific number of samples;
derive one or more local illumination compensation parameters for each group of the plurality of groups that are each associated with the one or more of the range of intensities or the range of positions to generate a plurality of local illumination compensation parameters for the current block;
derive a plurality of linear models between the neighboring luma block of the reference block and the neighboring luma block of the current block using the plurality of local illumination compensation parameters for the current block; and
generate a prediction block using the plurality of linear models.

15. The apparatus of claim 14, wherein, to derive the one or more local illumination compensation parameters, the one or more processors are configured to derive a and/or b for a respective group of the plurality of groups, $$\text{wherein } a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2},$$

$$\text{wherein } b = \frac{\sum_{i=0}^{2N-1} Rec_{neig}(i) - a \cdot \sum_{i=0}^{2N-1} Rec_{refneig}(i)}{2N},$$

wherein $Rec_{neig}$ denotes the second luma samples of the neighboring luma block of the current block, wherein $Rec_{refneig}$ denotes the first luma samples of the neighboring luma block of the reference block, and wherein N denotes a pixel number in $\text{Rec}_{neig}$ and $\text{Rec}_{refneig}$.

16. The apparatus of claim 14, wherein, to derive the plurality of linear models, the one or more processors are configured to derive linear relationships of each group of the plurality of groups to be continuous piece-wise.

17. The apparatus of claim 14, wherein, to derive the plurality of linear models, the one or more processors are configured to derive linear relationships of each group of the plurality of groups to be non-continuous piece-wise.

18. The apparatus of claim 14, wherein, to derive the plurality of linear models, the one or more processors are configured to derive the plurality of linear models using one or more of a first luma sample of the first luma samples of the neighboring luma block of the reference block that is arranged more than one row above the reference block, a second luma sample of the first luma samples of the neighboring luma block of the reference block that is arranged more than one column left of the reference block, a third luma sample of the second luma samples of the neighboring luma block of the current block that is arranged more than one row above the current block, or a fourth luma sample of the second luma samples of the current luma block of the reference block that is arranged more than one column left of the current block.

19. The apparatus of claim 14, wherein, to generate the prediction block, the one or more processors are configured to perform local illumination compensation for a sub-block of the current block.

20. The apparatus of claim 14, wherein the one or more processors are configured to perform bi-prediction using the prediction block.

21. The apparatus of claim 14, wherein the one or more processors are configured to signal one or more parameters for local illumination compensation, wherein deriving the one or more local illumination compensation parameters for each group is based on the one or more parameters for local illumination compensation.

22. The apparatus of claim 14, wherein the one or more processors are configured to apply different subsampling ratios to the first luma samples of the neighboring luma block of the reference block and the second luma samples of the neighboring luma block of the current block.

23. The apparatus of claim 14, wherein the apparatus comprises a wireless communication device, further comprising a receiver configured to receive encoded video data.

24. The apparatus of claim 23, wherein the wireless communication device comprises a telephone handset and wherein the receiver is configured to demodulate, according to a wireless communication standard, a signal comprising the encoded video data.

25. An apparatus comprising:
  means for classifying first luma samples of a neighboring luma block of a reference block and second luma samples of a neighboring luma block of a current block into a plurality of groups, wherein each one of the plurality of groups is each associated with one or more of a range of intensities or a range of positions, wherein the means for classifying comprises means for classifying two or more luma samples using one or more of intensities of the two or more luma samples or positions of the two or more luma samples, and wherein the means for classifying comprises means for restricting the first luma samples of the neighboring luma block of the reference block and the second luma samples of the neighboring luma block of the current block in a group of the plurality of groups such that a number of samples in the group satisfies a specific number of samples;
  means for deriving one or more local illumination compensation parameters for each group of the plurality of groups that are each associated with the one or more of the range of intensities or the range of positions to generate a plurality of local illumination compensation parameters for the current block;
  means for deriving a plurality of linear models between the neighboring luma block of the reference block and the neighboring luma block of the current block using the plurality of local illumination compensation parameters for the current block; and
  means for generating a prediction block using the plurality of linear models.

26. A non-transitory computer-readable storage medium storing instructions that, when executed, cause one or more processors to:
  classify first luma samples of a neighboring luma block of a reference block and second luma samples of a neighboring luma block of a current block into a plurality of groups, wherein each one of the plurality of groups is each associated with one or more of a range of intensities or a range of positions, wherein, to classify, the instructions cause the one or more processors to classify two or more luma samples using one or more of intensities of the two or more luma samples or positions of the two or more luma samples, and wherein, to classify, the instructions further cause the one or more processors to restrict the first luma samples of the neighboring luma block of the reference block and the second luma samples of the neighboring luma block of the current block in a group of the plurality of groups such that a number of samples in the group satisfies a specific number of samples;
  derive one or more local illumination compensation parameters for each group of the plurality of groups that are each associated with the one or more of the range of intensities or the range of positions to generate a plurality of local illumination compensation parameters for the current block;
  derive a plurality of linear models between the neighboring luma block of the reference block and the neighboring luma block of the current block using the plurality of local illumination compensation parameters for the current block; and
  generate a prediction block using the plurality of linear models.

* * * * *